(12) United States Patent
Miura et al.

(10) Patent No.: US 11,520,095 B2
(45) Date of Patent: Dec. 6, 2022

(54) LIGHT CONTROL FILM, METHOD FOR DRIVING LIGHT CONTROL FILM, LIGHT CONTROL MEMBER, AND VEHICLE

(71) Applicant: DAI NIPPON PRINTING CO., LTD., Tokyo (JP)

(72) Inventors: Keisuke Miura, Tokyo (JP); Yusuke Hagiwara, Tokyo (JP); Yasunori Hayashida, Tokyo (JP); Makoto Yamaki, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/088,648

(22) Filed: Nov. 4, 2020

(65) Prior Publication Data

US 2021/0048572 A1 Feb. 18, 2021

Related U.S. Application Data

(63) Continuation of application No. 16/310,214, filed as application No. PCT/JP2017/022366 on Jun. 16, 2017, now Pat. No. 10,845,522.

(30) Foreign Application Priority Data

Jun. 20, 2016 (JP) .............................. JP2016-121793
Oct. 7, 2016 (JP) .............................. JP2016-198967

(51) Int. Cl.
*G02B 5/30* (2006.01)
*G02F 1/13* (2006.01)
(Continued)

(52) U.S. Cl.
CPC ............. *G02B 5/3058* (2013.01); *G02B 5/30* (2013.01); *G02B 5/3033* (2013.01);
(Continued)

(58) Field of Classification Search
CPC .................................................. G02B 5/3058
See application file for complete search history.

(56) References Cited

U.S. PATENT DOCUMENTS

| | | | |
|---|---|---|---|
| 4,896,945 A | | 1/1990 | Doba et al. |
| 2007/0146910 A1* | | 6/2007 | Duston .............. G02F 1/29 359/834 |

(Continued)

FOREIGN PATENT DOCUMENTS

| | | | | |
|---|---|---|---|---|
| JP | 63-38921 | * | 2/1988 | ............. G02F 1/133 |
| JP | S63-038921 A | | 2/1988 | |

(Continued)

OTHER PUBLICATIONS

Dec. 22, 2020 Notification of Reasons for Refusal issued in JP Patent Application No. 2016-198967.

(Continued)

*Primary Examiner* — Sang V Nguyen
(74) *Attorney, Agent, or Firm* — Oliff PLC

(57) ABSTRACT

Provided is a light control film capable of gradually changing the in-plane transmittance and thereby adding an in-plane gradation between light and dark. A light control film 10 according to the present invention includes: a first electrode 22A and a second electrode 22B disposed facing each other; a light control material 14 disposed between the first electrode 22A and the second electrode 22B and changing the transmittance in accordance with the potential difference between the first electrode 22A and the second electrode 22B; and a potential gradient forming part for providing the gradient of the potential difference in the extension direction of the first electrode 22A and the second electrode 22B.

4 Claims, 21 Drawing Sheets

(51) Int. Cl.
  *G02F 1/03* (2006.01)
  *G02F 1/1335* (2006.01)
  *G02F 1/13357* (2006.01)
(52) U.S. Cl.
  CPC .............. *G02F 1/0316* (2013.01); *G02F 1/13* (2013.01); *G02F 1/133528* (2013.01); *G02F 1/133606* (2013.01)

(56) References Cited

U.S. PATENT DOCUMENTS

| | | | |
|---|---|---|---|
| 2007/0153354 A1 | 7/2007 | Duston et al. | |
| 2011/0170030 A1 | 7/2011 | Boote | |
| 2015/0070031 A1 | 3/2015 | Tanaka | |
| 2015/0346516 A1 | 12/2015 | Iigahama et al. | |
| 2017/0108740 A1* | 4/2017 | Kim | B32B 27/365 |

FOREIGN PATENT DOCUMENTS

| | | | |
|---|---|---|---|
| JP | H01-186911 A | 7/1989 | |
| JP | 02-99919 | * 4/1990 | ............. G02F 1/133 |
| JP | H02-099919 A | 4/1990 | |
| JP | H03-047392 A | 2/1991 | |
| JP | H06-160823 A | 6/1994 | |
| JP | H07-306394 A | 11/1995 | |
| JP | H08-184273 A | 7/1996 | |
| JP | 2012-503122 A | 2/2012 | |
| WO | 2009/005133 A1 | 1/2009 | |
| WO | 2014087447 A1 | 6/2014 | |

OTHER PUBLICATIONS

Schadt et al., "Surface-Induced Parallel Alignment of Liquid Crystals by Linearly Polymerized Photopolymers", Jpn. J. Appl. Phys., 31, 2155, 1992, pp. 2155-2164.
Schadt et al., "Optical Patterning of Mult-Domain Liquid-Crystal Displays with Wide Viewing Angles", Letters to Nature, 381, 212 1996, pp. 212-215.
Aug. 22, 2017 International Search Report issued in Patent Application No. PCT/JP2017/022366.
Dec. 6, 2016 Notice of Reasons for Rejection issued in Japanese Application No. 2016-121793.
Dec. 10, 2019 Extended European Search Report issued in European Patent Application No. 17815306.0.
Apr. 8, 2020 Office Action Issued in U.S. Appl. No. 16/310,214.

* cited by examiner

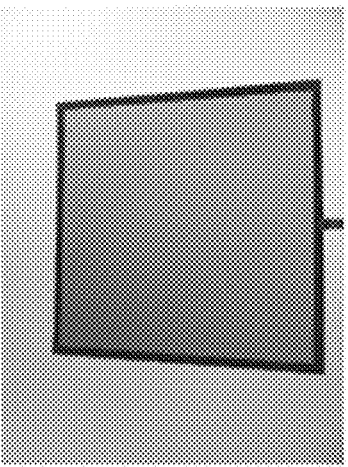
FIG. 21C 240Hz
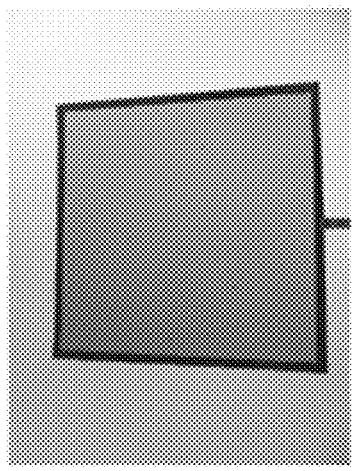
FIG. 21B 120Hz
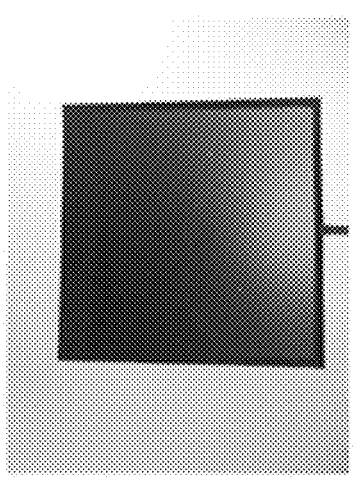
FIG. 21E 960Hz
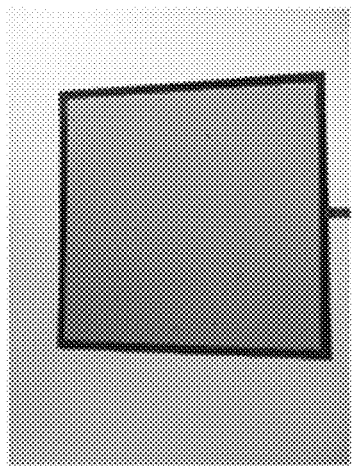
FIG. 21A 60Hz
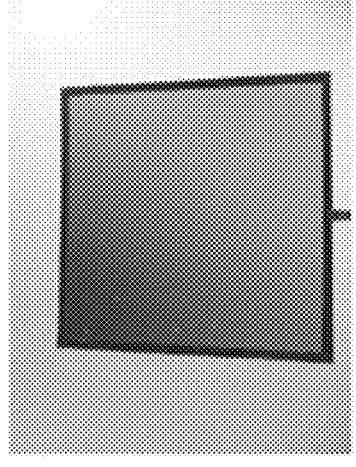
FIG. 21D 480Hz

LIGHT CONTROL FILM, METHOD FOR DRIVING LIGHT CONTROL FILM, LIGHT CONTROL MEMBER, AND VEHICLE

This application is a continuation of U.S. application Ser. No. 16/310,214 filed Dec. 14, 2018, which is a national stage application of PCT/JP2017/022366 filed Jun. 16, 2017. This application also claims priority to Japanese Patent Application No. 2016-198967 filed Oct. 7, 2016 and Japanese Patent Application No. 2016-121793 filed Jun. 20, 2016 the entire disclosures of which are herein incorporated by reference.

TECHNICAL FIELD

The present invention, for example, relates to a light control film capable of being used for an electronic blind controlling a transmission of external light by being pasted to window, a method for driving a light control film, a light control member, and a vehicle.

BACKGROUND ART

In the related art, for example, a light control film capable of being used for an electronic blind or the like, controlling a transmission of external light by being pasted to window, is proposed (Patent Documents 1 and 2). A light control film using liquid crystals is one of such light control films. The light control film using the liquid crystals is prepared by interposing a liquid crystal material between transparent plate materials including transparent electrodes to manufacture a liquid crystal cell, and by interposing the liquid crystal cell between linear polarization plates. In the light control film, the alignment of the liquid crystals is changed by changing an electrical field to be applied between the transparent electrodes, and thus, a transmission amount of the external light is controlled.

In such a light control film of the related art, in a case where a voltage is applied between the transparent electrodes, the transmittance is changed according to the voltage, but an in-plane transmittance of the light control film is approximately constant.

Patent Document 1: Japanese Unexamined Patent Application, Publication No. H03-47392
Patent Document 2: Japanese Unexamined Patent Application, Publication No. H08-184273

DISCLOSURE OF THE INVENTION

Problems to be Solved by the Invention

However, recently, the application of the light control film has been diversified, and there is a demand for a light control film capable of gradually changing the in-plane transmittance and thereby adding an in-plane gradation between light and dark. The present invention has been made in consideration of such circumstances, and an object thereof is to provide a light control film capable of gradually changing an in-plane transmittance and thereby adding an in-plane gradation between light and dark, a method for driving a light control film, a light control member, and a vehicle.

Means for Solving the Problems

Specifically, in the present invention, the followings will be provided.
(1) A light control film, including: a first electrode and a second electrode disposed facing each other; a light control material disposed between the first electrode and the second electrode and changing a transmittance in accordance with a potential difference between the first electrode and the second electrode; and a potential gradient forming part for providing a gradient of the potential difference in an extension direction of the first electrode and the second electrode.

(2) In the light control film of (1),
the light control film includes: a power feeding unit provided in the first electrode and adding a voltage between the first electrode and the second electrode, and
in a position different from the power feeding unit, the first electrode and the second electrode are electrically connected to each other.

(3) In the light control film of (2), a resistance member is disposed between the first electrode and the second electrode.

(4) In the light control film of (3), a resistance value of the resistance member is variable.

(5) In the light control film of (2) to (4), the power feeding unit is provided on one end side of the first electrode, and another end side of the first electrode and another end side of the second electrode are electrically connected to each other.

(6) In the light control film of (2) to (5), the power feeding unit is provided in a plurality of portions.

(7) In the light control film of (2) to (6), the first electrode and the second electrode are electrically connected to each other in a plurality of portions different from the power feeding unit.

(8) In the light control film of (1), the first electrode is divided into a plurality of regions, and the potential gradient forming part is a power source capable of feeding different potentials to each of the divided regions.

(9) In the light control film of (1), the potential gradient forming part is a power source providing a potential difference in different two points on the first electrode.

(10) In the light control film of (1), the potential gradient forming part is a power source feeding a frequency variable alternating-current voltage to the first electrode.

(11) A method for driving a light control film including a first electrode and a second electrode disposed facing each other, and a light control material disposed between the first electrode and the second electrode and changing a transmittance in accordance with a potential difference between the first electrode and the second electrode, the method including: providing a gradient of the potential difference in an extension direction of the first electrode and the second electrode.

(12) A light control member, including: a transparent member; and the light control film according to any one of (1) to (10), to be disposed on the transparent member.

(13) A vehicle including: the light control film according to any one of (1) to (10), to be disposed on a portion on which external light is incident.

Effects of the Invention

According to the present invention, it is possible to provide a light control film capable of gradually changing an in-plane transmittance and thereby adding an in-plane gradation between light and dark, a method for driving a light control film, a light control member, and a vehicle.

BRIEF DESCRIPTION OF THE DRAWINGS

FIG. 20A illustrates a case where the frequency is low, and FIG. 20B illustrates a case where the frequency is high.

FIGS. 21A to 21E are a picture illustrating a state of a transmission in a case where alternating-current voltages of different frequencies are applied to a light control film of 280 mm square, and FIG. 21A illustrates a case where the frequency of the alternating-current voltage is 60 Hz, FIG. 21B illustrates a case where the frequency of the alternating-current voltage is 120 Hz, FIG. 21C illustrates a case where the frequency of the alternating-current voltage is 240 Hz, FIG. 21D illustrates a case where the frequency of the alternating-current voltage is 480 Hz, and FIG. 21E illustrates a case where the frequency of the alternating-current voltage is 960 Hz.

PREFERRED MODE FOR CARRYING OUT THE INVENTION

First Embodiment

[Light Control Film]

Figure 1:
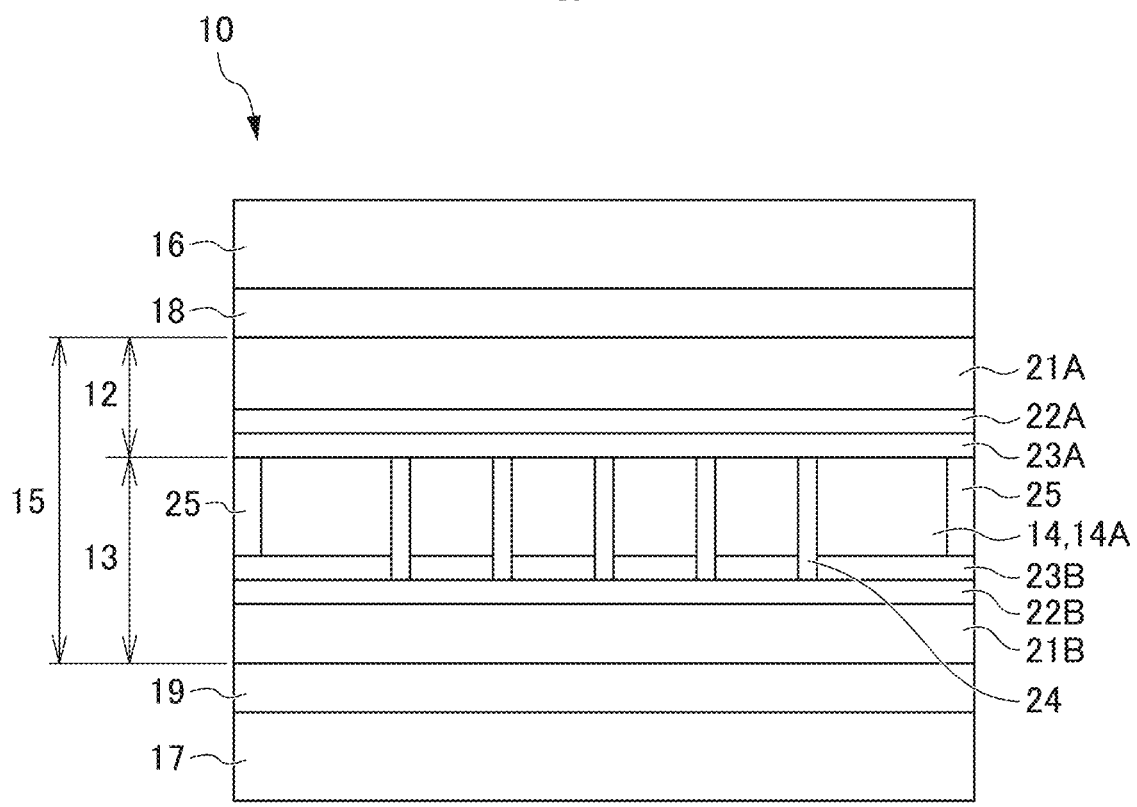
FIG. 1 is a sectional view illustrating a light control film of a first embodiment.

FIG. 1 is a sectional view illustrating a light control film 10 of a first embodiment. The light control film 10 is used by being disposed on a transparent member, for example, by being pasted to a portion for controlling light, or being used in laminated glass. In a case where the light control film 10 is used by being pasted to the portion for controlling light, for example, there is a case where the light control film 10 is disposed on a portion of a vehicle on which external light is incident (rear window or side window), window glass of an architectural structure, a showcase, and an indoor transparent partition, and the like, and thus, switches a transparent state and an opaque state. Here, the transparent member is glass, a transparent resin substrate, or the like. Thus, the light control film disposed on the transparent member will be referred to as a light control member.

The light control film 10 is a light control film controlling transmitted light by using liquid crystals, and is prepared by interposing a liquid crystal layer 14 between a second laminate 13 and a first laminate 12, in the shape of a film to manufacture a liquid crystal cell 15, and by interposing the liquid crystal cell 15 between linear polarization plates 16 and 17. In the embodiment, a vertical alignment (VA) system is adopted to the driving of the liquid crystal layer 14, but is not limited thereto, and various driving systems such as twisted nematic (TN) system and in-plane-switching (IPS) system, can be applied. Furthermore, the VA system is a system in which the alignment of the liquid crystals is changed between vertical alignment and horizontal alignment, and thus, the transmitted light is controlled, in the VA system, the liquid crystals are vertically aligned in the absence of an electrical field, and thus, the liquid crystal cell 15 is configured by interposing the liquid crystal layer 14 between vertical alignment layers, and liquid crystal materials are horizontally aligned as an electrical field is applied.

In the light control film 10, a spacer 24 for retaining the thickness of the liquid crystal layer 14 to be constant, is provided on the first laminate 12 and/or the second laminate 13. In the linear polarization plates 16 and 17, phase difference films 18 and 19 for optical compensation, are respectively provided on the liquid crystal cell 15 side. The laminates 12 and 13 are respectively formed by sequentially preparing a first electrode 22A, a second electrode 22B, and alignment layers 23A and 23B on base materials 21A and 21B. Furthermore, the phase difference films 18 and 19, may be omitted, as necessary. In addition, the light control film 10 may be manufactured by a guest-host system, and in this case, the linear polarization plate, as necessary, is disposed on one or both of the liquid crystal cells.

The light control film 10 controls the transmission of the external light by changing an applied voltage of the first electrode 22A and the second electrode 22B, and switches a transparent state and a non-transparent state. In this embodiment, an example of driving the liquid crystal layer 14 according to so-called normally black, will be described, but the driving of the liquid crystal layer 14 is not limited thereto, and the liquid crystal layer 14 may be driven according to normally white. In addition, in the IPS system, it is needless to say that the first electrode 22A and the second electrode 22B are collectively manufactured on the alignment layer 23A or 23B side, and the laminates 12 and 13 are configured corresponding thereto. Furthermore, the normally black is a structure in which a transmittance is minimized at the time of not applying a voltage to the liquid crystal, and thus, a screen becomes black. The normally white is a structure in which the transmittance is maximized at the time of not applying a voltage to the liquid crystal, and thus, the screen becomes transparent.

Furthermore, in a case where the light control film 10 is used by being pasted to, for example, window glass of an architectural structure, a showcase, an indoor transparent partition, and the like, a protective layer such as a hardcoat layer, is provided on a surface of the linear polarization plates 16 and/or 17 on a side opposite to the liquid crystal cell 15.

[Base Material]

Various transparent film materials such as TAC, polycarbonate, COP, acryl, and PET, which can be applied to the liquid crystal cell 15, can be applied to the base materials 21A and 21B, and in this embodiment, a film material of polycarbonate, in which a hardcoat layer is manufactured on both surfaces, is applied.

[Electrode]

The first electrode 22A and the second electrode 22B are capable of applying an electrical field to the liquid crystal layer 14, various configurations perceived as transparent, can be applied to the first electrode 22A and the second electrode 22B, and in this embodiment, the first electrode 22A and the second electrode 22B are formed by manufacturing a transparent conductive film of indium tin oxide (ITO), which is a transparent electrode material, on the entire surface of the base materials 21A and 21B. As described above, in the IPS system or the like, the electrode is manufactured by being patterned into a desired shape.

[Alignment Layer]

The alignment layers 23A and 23B are formed of a photo-alignment layer. Various materials to which a photo-alignment method can be applied, can be widely applied as a photo-alignment material capable of being applied to the photo-alignment layer, and in this embodiment, for example, a photodimerization type material is used. The photodimerization type material is disclosed in "M. Schadt, K. Schmitt, V. Kozinkov and V. Chigrinov: Jpn. J. Appl. Phys., 31, 2155 (1992)", "M. Schadt, H. Seiberle and A. Schuster: Nature, 381, 212 (1996)", and the like.

The alignment layers 23A and 23B may be manufactured by a rubbing treatment, instead of the photo-alignment layer. In this case, the alignment layers 23A and 23B are formed by manufacturing various material layers capable of being applied to an alignment layer of polyimide or the like, and then, by forming fine linear concavities and convexities on a front surface of the material layer, according to a rubbing treatment using a rubbing roll. The alignment layer may be manufactured by forming the fine linear concavities and convexities manufactured by the rubbing treatment, according to a molding treatment, instead of the rubbing treatment and the photo-alignment layer.

[Spacer]

The spacer 24 is provided in order to define the thickness of the liquid crystal layer 14, various resin materials can be widely applied to the spacer 24, and in this embodiment, the spacer 24 is manufactured by a photoresist. The spacer 24 is manufactured by applying the photoresist onto the base material 21B formed by manufacturing the second electrode 22B, and by performing exposure and development. Furthermore, the spacer 24 may be provided on the first laminate 12, or may be provided on both of the first laminate 12 and the second laminate 13. In addition, the spacer 24 can be provided on an arbitrary lamination position, insofar as being on the second base material 21B. For example, in addition to the form illustrated in FIG. 1, the spacer 24 may be provided on the alignment layer 23B, and may be provided between the second base material 21B and the second electrode 22B. In a case where the spacer 24 is provided on only one laminate, the spacer 24 can be provided directly on the base material, or the alignment layer is formed on the base material, and the spacer 24 can be provided on the alignment layer. In addition, a so-called bead spacer may be applied to the spacer. The bead spacer may be not only in the shape of a sphere, but also in the shape of a rod shape (a cylinder), an ellipsoid, and the like. In a case where the bead spacer is used as the spacer 24, the bead spacer is disposed by forming the alignment layer, and then, by dispersing the bead spacers onto the alignment layer. In this case, an anchoring layer formed of an adhesive agent or the like, may be provided on a front surface of the bead spacer, from the viewpoint of suppressing the movement of the bead spacer in the liquid crystal layer 14 (on the alignment layer). In addition, the bead spacer can be disposed at the same time when the alignment layer is formed by dispersing in advance the bead spacers in a resin forming the alignment layer, or the bead spacer can be disposed at the same time when the liquid crystal layer is formed by dispersing in advance the bead spacers in a liquid crystal material configuring the liquid crystal layer, from the viewpoint of suppressing the movement of the bead spacer in the liquid crystal layer 14. Furthermore, as with the photoresist spacer described above, the bead spacer may be disposed any one of the first laminate and the second laminate, and may be disposed on each of the laminates.

[Liquid Crystal Layer]

Various liquid crystal materials capable of being applied to this type of light control film, can be widely applied to the liquid crystal layer 14. Specifically, a nematic liquid crystal compound, a smectic liquid crystal compound, and a cholesteric liquid crystal compound can be applied to the liquid crystal layer 14, as a liquid crystal compound not having a polymerizable functional group. Examples of the nematic liquid crystal compound are capable of including a biphenyl-based compound, a terphenyl-based compound, a phenyl cyclohexyl-based compound, a biphenyl cyclohexyl-based compound, a phenyl bicyclohexyl-based compound, a trifluoro-based compound, a phenyl benzoate-based compound, a cyclohexyl phenyl benzoate-based compound, a phenyl phenyl benzoate-based compound, a bicyclohexyl phenyl carboxylate-based compound, an azomethine-based compound, an azo-based compound, an azooxy-based compound, a stilbene-based compound, a tolan-based compound, an ester-based compound, a bicyclohexyl-based compound, a phenyl pyrimidine-based compound, a biphenyl pyrimidine-based compound, a pyrimidine-based compound, a biphenyl ethyne-based compound, and the like. Examples of the smectic liquid crystal compound are capable of including a ferroelectric polymer liquid crystal compound such as a polyacrylate-based compound, a polymethacrylate-based compound, a polychloroacrylate-based compound, a polyoxirane-based compound, a polysiloxane-based compound, and a polyester-based compound. Examples of the cholesteric liquid crystal compound are capable of including cholesteryl linoleate, cholesteryl oleate, cellulose, cellulose derivative, polypeptide, and the like. In addition, for example, a liquid crystal material such as MLC2166, manufactured by Merck & Co., can be applied as a commercially available product. Furthermore, in the guest-host system, the liquid crystal material and a dye for controlling light are mixed into the liquid crystal layer 14, and thus, a mixture of the liquid crystal material and the dye, proposed in the guest-host system, can be widely applied. In the liquid crystal cell 15, a seal material 25 is disposed to surround the liquid crystal layer 14, and the leakage of the liquid crystal is prevented by the seal material 25. Here, for example, an epoxy resin, an ultraviolet curable resin, and the like can be applied as the seal material 25.

[Manufacturing Step]

Figure 2:
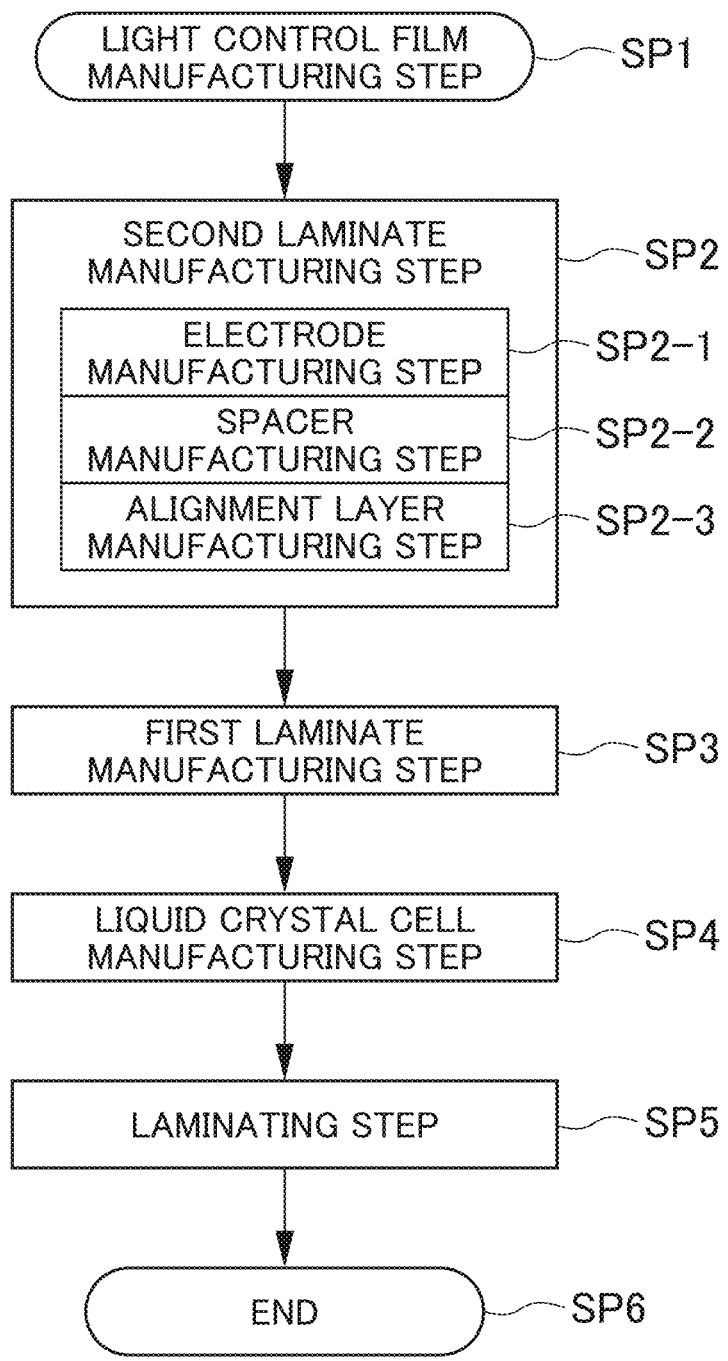
FIG. 2 is a flowchart illustrating a manufacturing step of the light control film.

FIG. 2 is a flowchart illustrating a manufacturing step of the light control film 10. In the liquid crystal cell 15, the second laminate 13 is manufactured in a second laminate manufacturing step SP2. In the second laminate manufacturing step SP2, the second electrode 22B of ITO is manufactured on the base material 21B by sputtering or the like, in an electrode manufacturing step SP2-1. Subsequently, in a spacer manufacturing step SP2-2, a coating liquid (the photoresist) according to the spacer 24 is applied, and then, is dried, exposed, and developed, and thus, the spacer 24 is manufactured. Subsequently, in an alignment layer manufacturing step SP2-3, a coating liquid according to the alignment layer 23B is applied and dried, and then, is irradiated with an ultraviolet ray, and thus, an alignment direction of liquid crystal molecules is set, and therefore, the alignment layer 23B is manufactured. Accordingly, in this embodiment, the second laminate 13 is manufactured. Furthermore, in the above description, an example has been described in which the spacer 24 is manufactured by applying the coating liquid, and then, by exposing and developing the coating liquid, but the manufacturing of the spacer 24 is not limited thereto, and the spacer 24 may be formed by using a photo-curable resin or a thermosetting resin, by molding, printing, or the like.

Subsequently, in a first laminate manufacturing step SP3 of the manufacturing step of the light control film 10, the first laminate 12 is manufactured as with the second laminate manufacturing step SP2. That is, in the first laminate manufacturing step SP3, the first electrode 22A of ITO is manufactured on the base material 21A by sputtering or the like, and a coating liquid according to the alignment layer 23A is applied and dried, and then, is irradiated with an ultraviolet ray, and thus, the alignment direction of the liquid crystal molecules is set, and therefore, the alignment layer 23A is manufactured, and the first laminate 12 is manufactured.

Subsequently, in a liquid crystal cell manufacturing step SP4 of the manufacturing step, the seal material 25 is applied into the shape of a frame by using a dispenser, and then, the liquid crystal material is disposed in the frame-like portion, the first laminate 12 and the second laminate 13 are laminated and pressed, and the seal material 25 is cured by being irradiated with an ultraviolet ray, or the like, and thus, the liquid crystal cell 15 is manufactured. Furthermore, in the disposition of the liquid crystal material, the first laminate 12 and the second laminate 13 are laminated in advance, and the liquid crystal material may be disposed in a gap formed by laminating the first laminate 12 and the second laminate 13.

Subsequently, in a laminating step SP5, the light control film 10 is formed by being laminated with the linear polarization plates 16 and 17. Furthermore, the liquid crystal cell 15 is provided in the form of a long film of which the base materials 21A and 21B are wound around a roll, and all of steps SP2 to SP5 or a part of steps SP2 to SP5, are executed while the base materials 21A and 21B are transported by being pulled out from the roll. Furthermore, in the liquid crystal cell 15, as necessary, each step is executed by processing the base materials one by one, from the middle step.

[Voltage Application]

Figure 3:
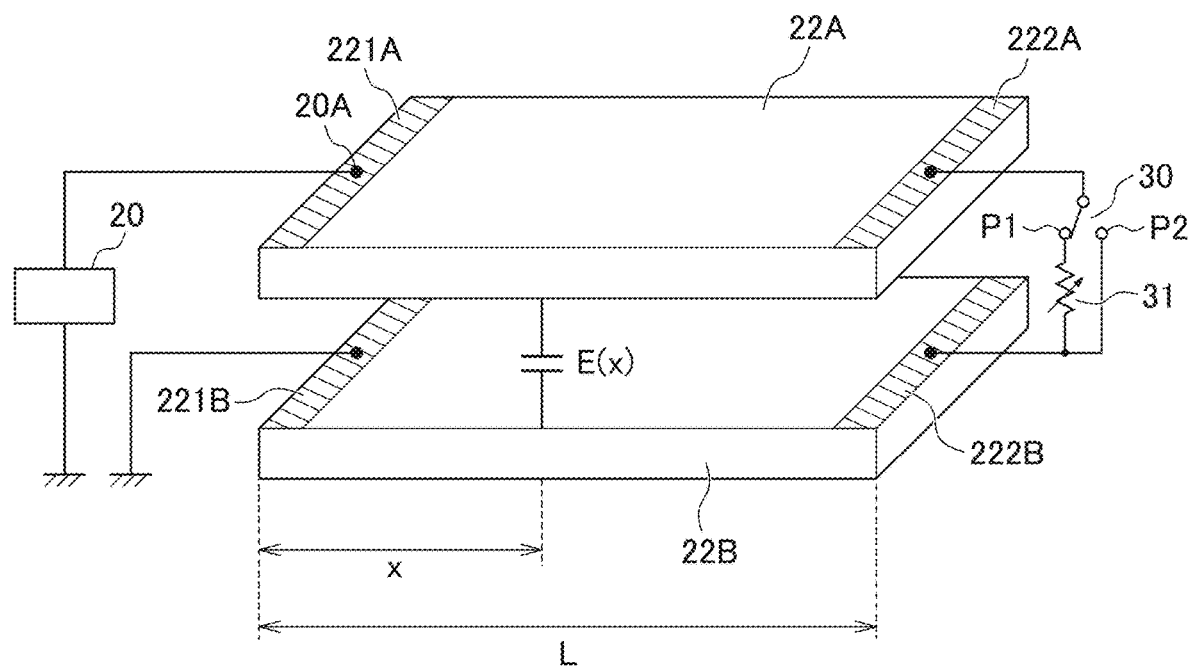
FIG. 3 is a diagram illustrating a voltage applied between electrodes.

FIG. 3 is a diagram illustrating a voltage to be applied between the first electrode 22A and the second electrode 22B. In this embodiment, the first electrode 22A and the second electrode 22B are in the shape of a rectangle, but are not limited thereto. Then, conductive units 221A and 222A are provided by a silver paste or the like, on both ends of the first electrode 22A in a longitudinal direction. Conductive units 221B and 222B are provided by a silver paste or the like, on both ends of the second electrode 22B in a longitudinal direction. The conductive units 221A, 222A, 221B, and 222B extend in a transverse direction on an end portion of the first electrode 22A and the second electrode 22B in the longitudinal direction.

A power feeding unit 20A to which a power source 20 is attached, is provided in the conductive unit 221A on one end of the first electrode 22A, and a predetermined voltage $E_0$ is applied to the conductive unit 221A from the power feeding unit 20A. The size of the voltage $E_0$ is variable by adjusting the power source 20. Furthermore, in this embodiment, the voltage is a direct-current voltage, but is not limited thereto, and may be an alternating-current voltage.

The conductive unit 221B on one end of the second electrode 22B is grounded. A three-way switch 30 is connected to the conductive unit 222A on the other end of the first electrode 22A. One end of a variable resistance 31 is connected to one contact point P1 to be selected by the three-way switch 30, and the other end of the variable resistance 31 is connected to the conductive unit 222B on the other end of the second electrode 22B. The other contact point P2 to be selected by the three-way switch 30 is connected to the conductive unit 222B on the other end of the second electrode 22B, not through a resistance. As described above, a potential gradient forming part of the first embodiment is configured. Furthermore, in this embodiment, it has been described that the conductive unit 222A on the other end of the first electrode 22A is selectively connected to the conductive unit 222B on the other end of the second electrode 22B through the variable resistance 31, or to the conductive unit 222B on the other end of the second electrode 22B not through the variable resistance 31, by the three-way switch 30. However, the present invention is not limited thereto. The conductive unit 222A on the other end of the first electrode 22A and the conductive unit 222B on the other end of the second electrode 22B, for example, may be directly in contact with each other not through the three-way switch 30, may be pasted to each other by a conductive paste, may be connected to each other by a conductive line, or may be connected to each other through the resistance or the variable resistance.

Figure 4:
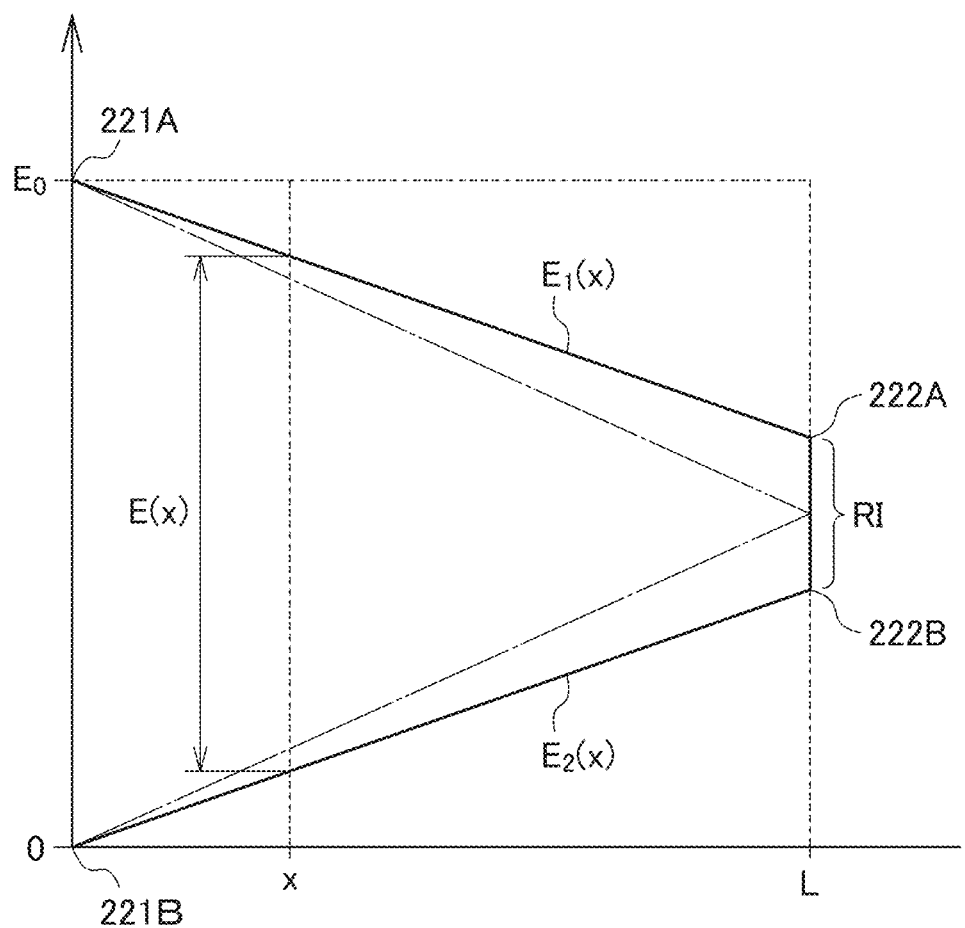
FIG. 4 illustrates a state of a potential of a second electrode and a first electrode.

The state of the potential of the first electrode 22A and the second electrode 22B in a case where the voltage $E_0$ is applied to the conductive unit 221A of the first electrode 22A, and the conductive unit 221B of the second electrode 22B is connected to the earth, is illustrated in FIG. 4.

When the three-way switch 30 is opened without being connected to any of the contact points P1 and P2, the resistance becomes infinite, and thus, as illustrated by a dotted line in FIG. 4, the potential of the first electrode 22A is approximately constantly a potential $E_0$, and the potential of the second electrode 22B is a potential 0. In a case where the three-way switch 30 is connected to the contact point P2 in FIG. 3, a resistance value R is approximately zero, and thus, RI is 0, and a form as illustrated by a dashed-dotted line in FIG. 4, is obtained. In a case where the three-way switch 30 is connected to the contact point P1 in FIG. 3, RI is changed according to the resistance value R of the variable resistance 31. The resistance value R of the variable resistance 31, for example, can be adjusted by a knob or the like. In a case where the resistance value R of the variable resistance 31 increases, a potential difference RI between the conductive unit 222A of the first electrode 22A and the conductive unit 222B of the second electrode 22B, increases. In a case where the resistance value R of the variable resistance decreases, the potential difference RI between the conductive unit 222A of the first electrode 22A and the conductive unit 222B of the second electrode 22B, decreases.

As illustrated, a potential $E_1(x)$ of the first electrode 22A, is power-fed $E_0$, in the conductive unit 221A on one end side, and decreases as proceeding to the direction of the conductive unit 222A on the other end side. Then, in the position of the conductive unit 222A (a position of a distance L from one end side), the potential decreases by RI (R: the resistance value of the variable resistance, and I: a current flowing through the variable resistance). A potential $E_2(x)$ of the conductive unit 222B on the other end side of the second electrode 22B is a potential decreased by RI, and decreases as being directed towards the conductive unit 221B on one end side therefrom, and thus, the potential becomes 0 V, in the conductive unit 221B.

In a position of a distance x from one end of the first electrode 22A and the second electrode 22B, a potential difference (a voltage) $E(x)$ between the potential $E_1(x)$ of the first electrode 22A and the potential $E_2(x)$ of the second electrode 22B, is represented as follows.

$$E(x)=E_1(x)-E_2(x) \tag{1}$$

Here, in a case where a resistance value of the total length of the first electrode 22A is set to $R_1$, and a resistance value of the total length of the second electrode 22B is set to $R_2$, $$E_1(x)=E_0-R_1Ix/L \tag{2}$$

$$E_2=R_2Ix/L \tag{3}$$

$$E_0=I(R+R_1+R_2) \tag{4}$$

are obtained, and
in a case where (1) is modified by putting (2) to (4), or the like, $$E(x)=E_0-E_0(R_1+R_2)/(R+R_1+R_2)x/L \tag{1'}$$

is obtained.

Figure 5:
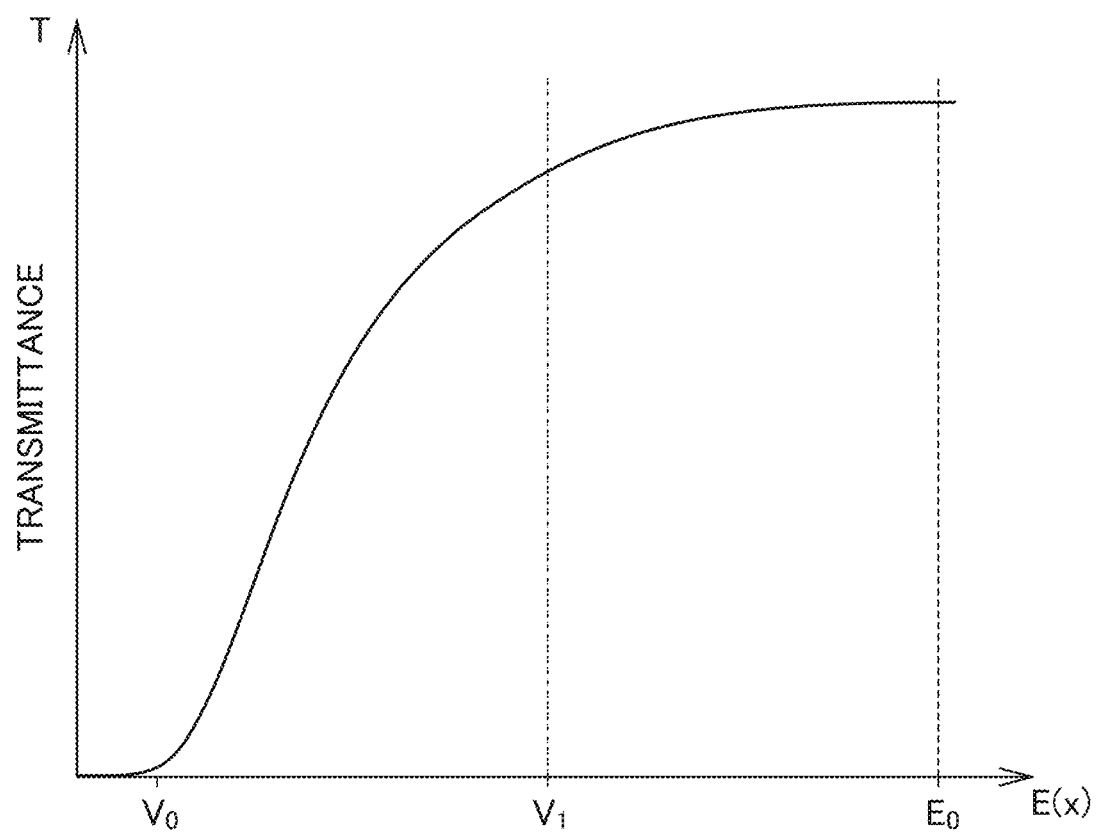
FIG. 5 is graph illustrating a relationship between a transmittance of the light control film and a potential difference.

Here, FIG. 5 is a graph illustrating a relationship between the transmittance T of the light control film 10 and the potential difference $E(x)$. The tilt of the liquid crystal is changed according to the potential difference $E(x)$, and thus, as illustrated, the transmittance T of the light control film 10 is changed according to the change in the potential difference $E(x)$.

In this embodiment, in a case where the switch 30 is connected to the contact point P1, the potential difference $E(x)$ between the first electrode 22A and the second electrode 22B in the light control film 10, is changed according to the position x in the longitudinal direction, as represented by Expression (1)'. Therefore, the transmittance T of the light control film 10 can be gradually changed in the longitudinal direction (capable of adding a gradation or adding a contrasting density). In addition, the rate of the change is changed by changing the resistance value R, and thus, the gradation can be set to a desired contrasting density.

In addition, as illustrated in FIG. 5, the relationship between the transmittance T of the light control film 10 and the potential difference E is not linear, and the transmittance is 0 while the potential difference $E(x)$ is changed from 0 to $V_0$, in a case where the potential difference $E(x)$ is greater than $V_0$, the transmittance rapidly rises up, and in a case where the potential difference $E(x)$ is greater than $V_1$, the tilt gradually becomes gentle, and becomes approximately constant. That is, a variation in the transmittance T is large between $V_0$ and $V_1$, and thus, the potential difference $E(x)$ illustrated in FIG. 4, is changed within a range of $V_0$ to $V_1$, and thus, it is possible to allow the transmittance T to vary more largely. That is, it is possible to increase the width of the gradation, and in other words, it is possible to increase the width of the contrasting density.

That is, $$V_0 \leq E(x) \leq V_1$$

is obtained, and $E(x)$ is changed between $E_0-E_0(R_1+R_2)/(R+R_1+R_2)=IR$ and $E_0$, and thus, $$IR \leq V_0 < V_1 \leq E_0$$

is obtained.

In a case where the expression is modified, $$R \leq V_0/I = V_0(R+R_1+R_2)/E_0$$

$$E_0 R \leq V_0(R+R_1+R_2)$$

$$(E_0-V_0)R \leq V_0(R_1+R_2)$$

$$R \leq V_0(R_1+R_2)/(E_0-V_0)$$

are obtained, and thus, $$0 \leq R \leq V_0(R_1+R_2)/(E_0-V_0)$$

is obtained.

According to this embodiment, the resistance value R is set to be in the range, and thus, it is possible to increase a change amount of the transmittance T with respect to a change in the voltage, and to largely increase the width of a contrasting density of an in-plane gradation, in the light control film 10. Here, the range of the resistance value R is not limited to the expression described above.

Next, another voltage applied form (the potential gradient forming part) of the light control film will be described.

[Another Voltage Applied Form 1]

Figure 6:
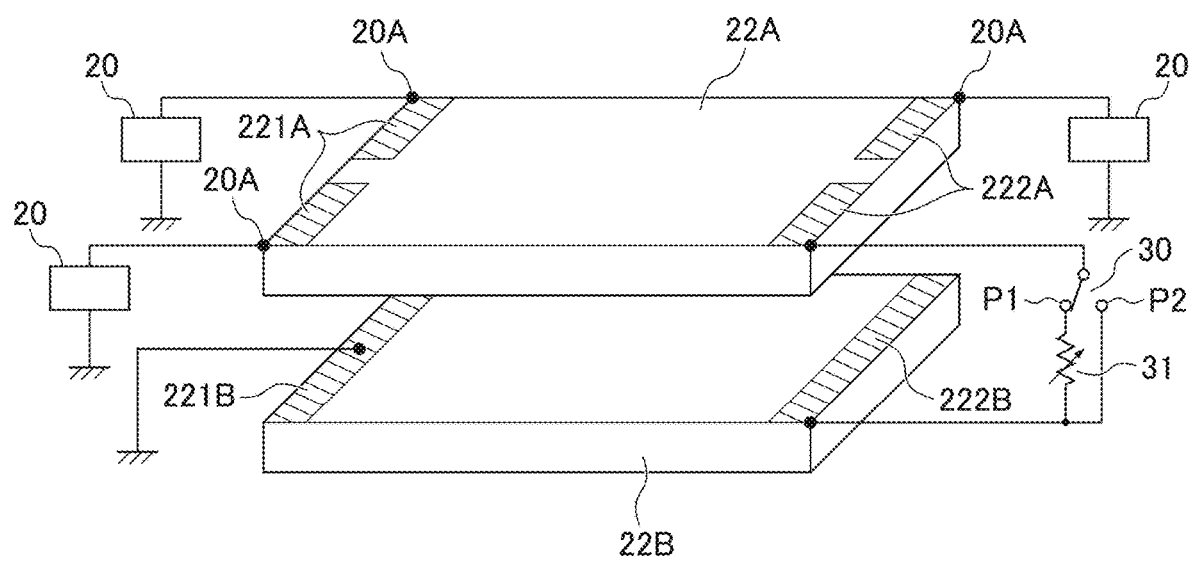
FIG. 6 is a diagram illustrating another voltage applied form 1 of the light control film.

FIG. 6 is a diagram illustrating another voltage applied form 1 of the light control film. The second electrode 22B of the light control film of this form illustrated in FIG. 6, has the same configuration as that of the second electrode 22B illustrated in FIG. 3 described above. On the other hand, the first electrode 22A of this form is different from the first electrode 22A illustrated in FIG. 3, and each of the conductive units 221A and 222A is divided into two conductive units, the power feeding unit 20A is provided in each of two conductive units 221A and one conductive unit 222A, and the power source 20 is individually connected thereto. The three-way switch 30 is connected to the other conductive unit 222A to which the power source 20 is not connected. One contact point P1 to be selected by the three-way switch 30, is connected to the conductive unit 222B of the second electrode 22B through the variable resistance 31, and the contact point P2 is connected to the conductive unit 222B of the second electrode 22B not through the resistance.

Thus, a plurality of power feeding units 20A are provided, and a voltage can be individually applied from a plurality of portions, and thus, it is possible to partially change the transmittance of the light control film. For example, in a case where a voltage is applied to only one of a plurality of power feeding units, a transmission state of the light control film can also be adjusted such that a transmittance in the vicinity of the power feeding unit to which the voltage is applied, is changed according to the applied amount of the voltage, and a change in the transmittance decreases in the vicinity of other power feeding units. Furthermore, the number of power feeding units 20A provided in the electrode, may suitably increase or decrease, according to a use application of the light control film, an outer shape of the electrode, and the like.

[Another Voltage Applied Form 2]

Figure 7:
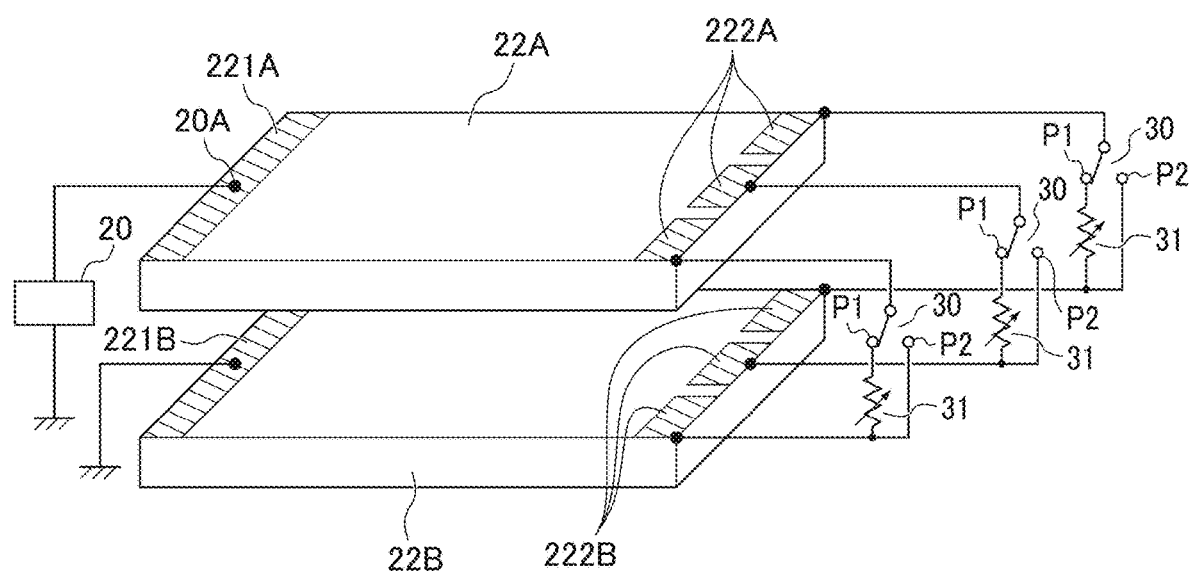
FIG. 7 is a diagram illustrating another voltage applied form 2 of the light control film.

FIG. 7 is a diagram illustrating another voltage applied form 2 of the light control film. The conductive unit 222A of the first electrode 22A of the light control film illustrated in FIG. 7 is divided into three conductive units, and the conductive unit 222B of the second electrode 22B is also divided into three conductive units to correspond to each of the divided conductive units 222A. As illustrated in FIG. 7, the variable resistance 31 connected to the three-way switch 30 is disposed between each of three conductive units 222A, and each of the conductive units 222B facing thereto.

Thus, a plurality of conductive units 222A and 222B are provided on one end side of each of the electrodes, the variable resistance 31 is provided between each of the conductive units 222A and each of the conductive units 222B facing each other, and the resistance value of each of the variable resistances 31 is individually changed, and thus, the light control film is capable of allowing the transmittance to vary along a direction in which the plurality of conductive units 222A and 222B are arranged, and to realize a gradation with different tones. In addition, the conductive unit is provided on a side (a short side) of each of the electrodes adjacent to the conductive units 222A and 222B, and the variable resistance may be provided in the conductive unit. Accordingly, it is possible to more finely adjust a potential difference between the electrodes, and to adjust the region of the light control film in a light transmitting state, the shape of a region in a light shielding state, and a range (an area).

[Another Voltage Applied Form 3]

Figure 8:
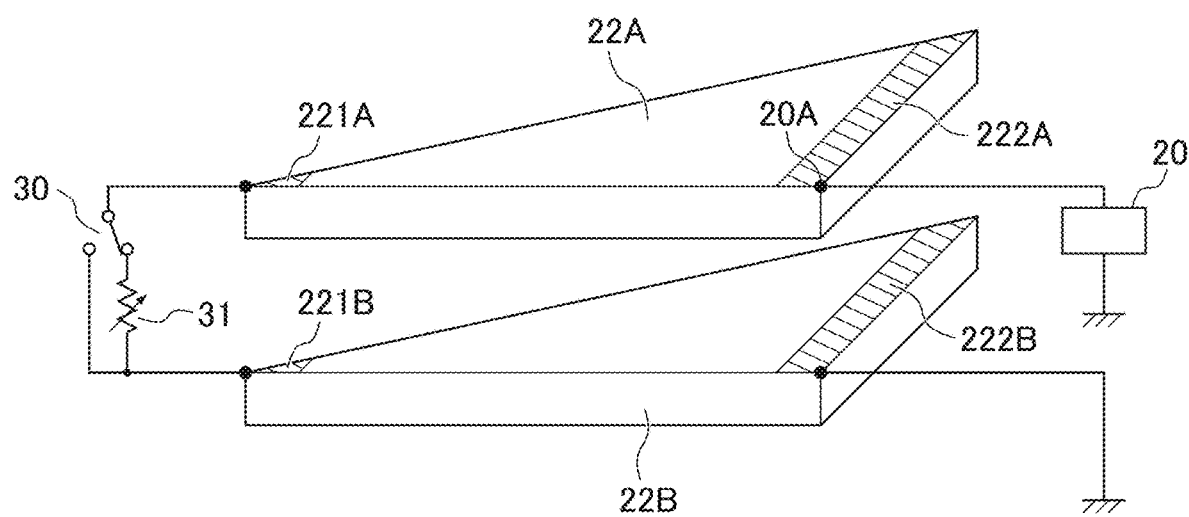
FIG. 8 is a diagram illustrating another voltage applied form 3 of the light control film.

FIG. 8 is a diagram illustrating another voltage applied form 3 of the light control film. The light control film of this form is formed into the shape of a triangle. Accordingly, as illustrated in FIG. 8, the first electrode 22A and the second electrode 22B are formed into the shape of a triangle. In the first electrode 22A, the conductive units 221A and 222A are respectively provided on one apex of a triangle, and a side facing the apex. In addition, in the second electrode 22B, the conductive units 221B and 222B are respectively provided on one apex of a triangle, and a side facing the apex, to correspond to the first electrode 22A. The variable resistance 31 connected to the three-way switch 30, is connected between the conductive unit 221A of the first electrode 22A and the conductive unit 221B of the second electrode 22B. In addition, the power feeding unit 20A is provided in one end portion of the conductive unit 222A of the first electrode 22A, and the power source 20 is connected to the power feeding unit 20A. The conductive unit 222B of the second electrode 22B is grounded. Thus, even in a case where the light control film is formed into the shape of a triangle, as with the rectangular light control film described above, the transmittance of the light control film 10 is gradually changed between the one apex described above and the side facing the apex, and thus, it is possible to form a gradation.

Second Embodiment to Fourth Embodiment

Next, light control films of a second embodiment to a fourth embodiment will be described.

[Light Control Film]

Figure 9:
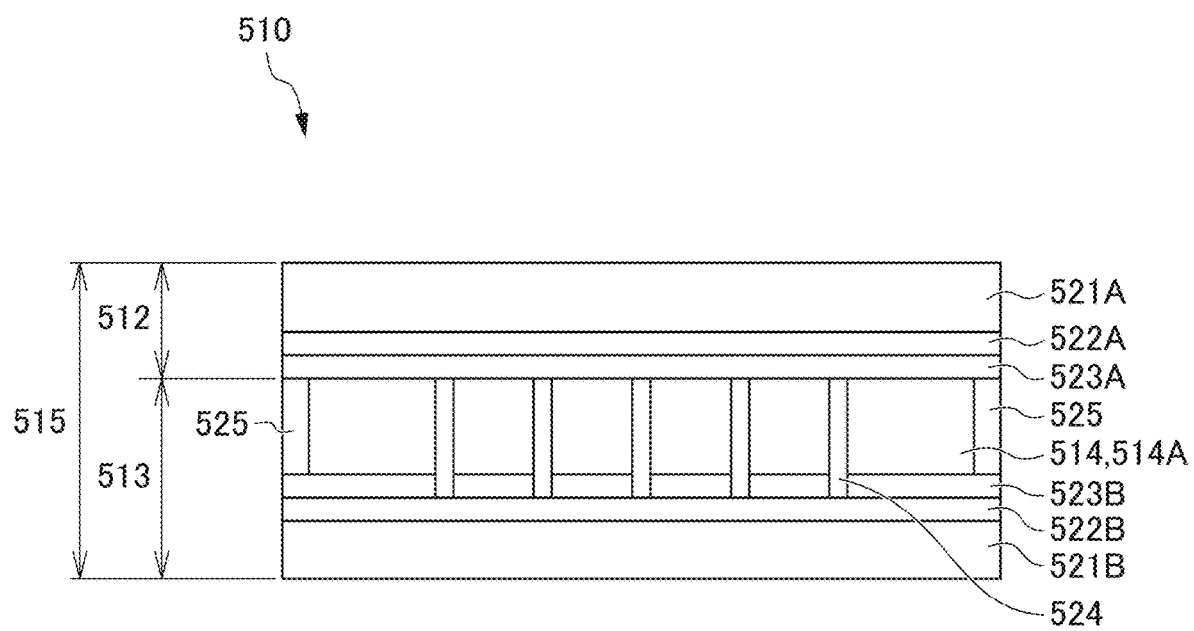
FIG. 9 is a sectional view illustrating light control films of a second embodiment to a fourth embodiment.

FIG. 9 is a sectional view of a light control film 510 of a second embodiment. Hereinafter, a layer configuration, a manufacturing method, and the like of the light control film of the second embodiment, will be described, and the same applies to the light control film of the third embodiment and the fourth embodiment. Furthermore, in the following description and the drawings, the same reference numerals will be applied to the end (the last two digits) of the same parts having the same functions as those of the first embodiment described above, and the repeated description will be suitably omitted. The light control film 510 is a light control film controlling transmitted light by using liquid crystals, and includes a liquid crystal cell 515 interposing a liquid crystal layer 514 between a film-like second laminate 513 and a film-like first laminate 512. In this embodiment, a vertical alignment (VA) system is adopted to the driving of the liquid crystal layer 514. The VA system is a system in which the alignment of the liquid crystals is changed between vertical alignment and horizontal alignment, and thus, the transmitted light is controlled, in the VA system, the liquid crystals are vertically aligned in the absence of an electrical field, and thus, the liquid crystal cell 515 is configured by interposing the liquid crystal layer 514 between vertical alignment layers, and liquid crystal materials are horizontally aligned as an electrical field is applied.

However, the driving of the liquid crystal layer 514 is not limited thereto. For example, a TN system (a twisted nematic liquid crystal) may be used as a liquid crystal light control film other than the VA system. In the TN system, when the voltage is not applied, liquid crystal molecules of the light control film are horizontally arranged, and transmit light, and thus, a screen becomes "white". In a case where a voltage is gradually applied, the liquid crystal molecules vertically rise up, and shield light, and thus, the screen becomes black. In addition, an in-plane-switching (IPS) system may be used. The IPS system is a driving system in which driving electrodes are collectively prepared on one base material of a pair of base materials interposing a liquid crystal layer, a so-called transverse electrical field, which is an electrical field in an in-plane direction on a front surface of the base material, is formed by the electrodes, and thus, the alignment of liquid crystals is controlled.

In the light control film 510, a spacer 524 for retaining the thickness of the liquid crystal layer 514 to be constant, is provided on the first laminate 512 and/or the second laminate 513. The first laminate 512 and the second laminate 513 are respectively formed by sequentially preparing a first electrode 522A, a second electrode 522B, and alignment layers 523A and 523B, on base materials 521A and 521B. In addition, in the IPS system, it is needless to say that the first electrode 522A and the second electrode 522B are collectively manufactured on the alignment layer 523A or 523B, and the first laminate 512 and the second laminate 513 are configured corresponding thereto.

The light control film 510 controls the transmission of the external light by changing a potential difference between the first electrode 522A and the second electrode 522B, and switches a transparent state and a non-transparent state. In this embodiment, the liquid crystal layer 514 is driven according to so-called normally white. Furthermore, the normally white is a structure in which a transmittance is maximized at the time of not applying a voltage to the liquid crystal, and thus, a screen becomes transparent.

In a case where the light control film 510, for example, is used by being pasted to window glass of an architectural structure, a showcase, and an indoor transparent partition, and the like, a protective layer such as a hardcoat layer, may be provided on the surfaces of the liquid crystal cell 515 on both sides.

[Base Material]

In this embodiment, a film material of polycarbonate, in which a hardcoat layer is manufactured on both surfaces, is applied to the base materials 521A and 521B.

[Electrode]

The same configuration as that of the first embodiment described above, can be applied to the first electrode 522A and the second electrode 522B, and in this embodiment, the first electrode 522A and the second electrode 522B are formed by manufacturing a transparent conductive film of indium tin oxide (ITO), which is a transparent electrode material, on the entire surface of the base materials 521A and 521B.

[Alignment Layer]

The alignment layers 523A and 523B, are formed of a photo-alignment layer, as with the first embodiment described above.

[Spacer]

The same resin material as that of the first embodiment described above, can be widely applied to the spacer 524, and in this embodiment, the spacer 524 is manufactured by a photoresist. A so-called bead spacer may be applied to the spacer.

[Liquid Crystal Layer]

Various liquid crystal materials capable of being applied to this type of light control film, can be widely applied to the liquid crystal layer 514. Specifically, the same material as that of the first embodiment described above can be applied. Furthermore, in this embodiment, a guest-host system is adopted in which the liquid crystal material and a dye for controlling light are mixed into the liquid crystal layer 514. A guest-host type liquid crystal is a liquid crystal into which a dichroic dye is mixed. The dichroic dye is moved according to the movement of liquid crystal molecules, and thus, it is possible to control light shielding and light transmitting. A mixture of the liquid crystal material and the dye, proposed in the guest-host system, can be widely applied as the liquid crystal material and the dye, capable of being used in the guest-host system. In the liquid crystal cell 515, a seal material 525 is disposed to surround the liquid crystal layer 514, and the leakage of the liquid crystal is prevented by the seal material 525. Here, for example, an epoxy resin, an ultraviolet curable resin, and the like can be applied to the seal material 525.

[Manufacturing Step]

Figure 10:
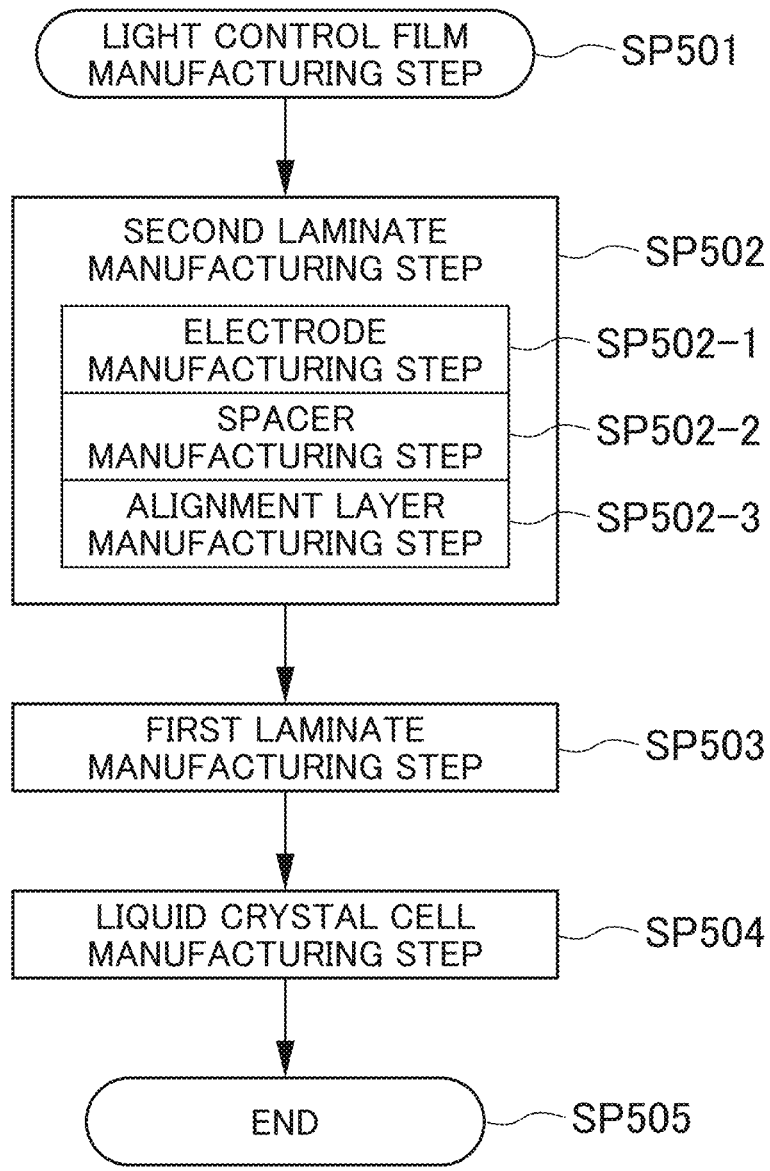
FIG. 10 is a flowchart illustrating a manufacturing step of the light control film.

FIG. 10 is a flowchart illustrating a manufacturing step of the light control film 510. In a second laminate manufacturing step SP502, the second laminate 513 of the liquid crystal cell 15 is manufactured. In the second laminate manufacturing step SP502, the second electrode 522B of ITO is manufactured on the base material 521B by sputtering or the like, in an electrode manufacturing step SP502-1. Subsequently, in a spacer manufacturing step SP502-2, a coating liquid (the photoresist) according to the spacer 524 is applied, and then, dried, exposed, and developed, and thus, the spacer 524 is manufactured. In addition, subsequently, in an alignment layer manufacturing step SP502-3, a coating liquid according to the alignment layer 523B is applied and dried, and then, is irradiated with an ultraviolet ray, and thus, an alignment direction of the liquid crystal molecules is set, and therefore, the alignment layer 523B is manufactured. In this embodiment, the second laminate 513 is manufactured as described above. Furthermore, in the above description, an example has been described in which the spacer 524 is manufactured by applying the coating liquid, and then, by exposing and developing the coating liquid, but the manufacturing of the spacer 524 is not limited thereto, and the spacer 524 may be formed by using a photo-curable resin or a thermosetting resin, by molding, printing, or the like.

Subsequently, in a first laminate manufacturing step SP503 of the manufacturing step of the light control film 510, the first laminate 512 is manufactured as with the second laminate manufacturing step SP502. That is, in the first laminate manufacturing step SP503, the first electrode 522A of ITO is manufactured on the base material 521A by sputtering or the like, and a coating liquid according to the alignment layer 523A is applied and dried, and then, is irradiated with an ultraviolet ray, and thus, an alignment direction of the liquid crystal molecules is set, and therefore, the alignment layer 523A is manufactured, and the first laminate 512 is manufactured.

Subsequently, in a liquid crystal cell manufacturing step SP504 of the manufacturing step, the seal material 525 is applied into the shape of a frame by using a dispenser, and then, the liquid crystal material is disposed in the frame-like portion, the first laminate 512 and the second laminate 513 are laminated and pressed, and the seal material 525 is cured by being irradiated with an ultraviolet ray, or the like, and thus, the liquid crystal cell 515 is manufactured. Furthermore, in the disposition of the liquid crystal material, the first laminate 512 and the second laminate 513 are laminated in advance, and the liquid crystal material may be disposed in a gap formed by laminating the first laminate 512 and the second laminate 513.

Furthermore, the liquid crystal cell 515 is provided in the form of a long film in which the base materials 521A and 521B are wound around a roll, and all of steps SP502 to SP504 or a part of steps SP502 to SP504, are executed while the base materials 521A and 521B are transported by being pulled out from the roll. Furthermore, in the liquid crystal cell 515, as necessary, each step is executed by processing the base materials one by one, from the middle step.

Second Embodiment

Figure 11:
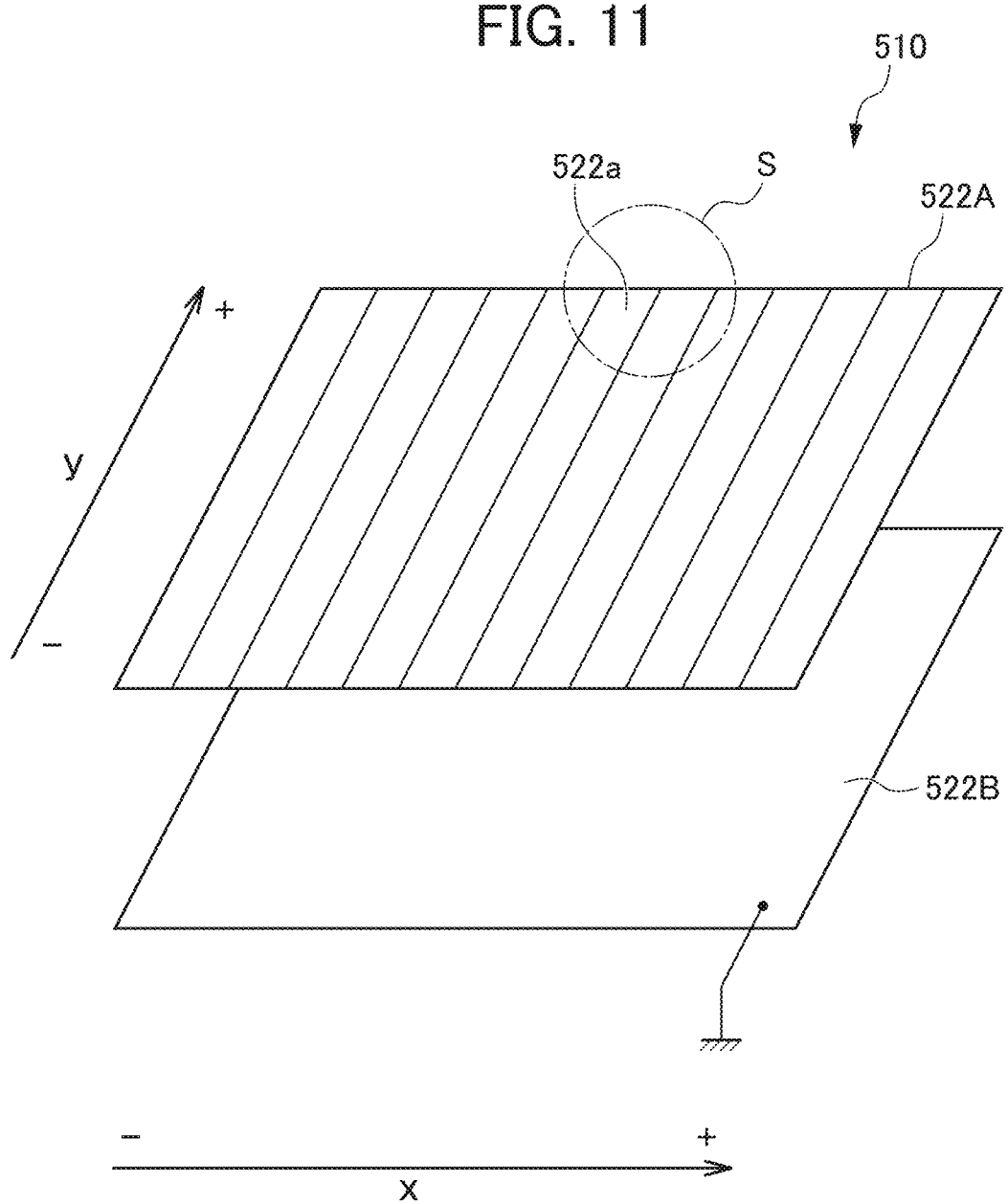
FIG. 11 is a diagram illustrating a first electrode and a second electrode of the second embodiment.
Figure 12:
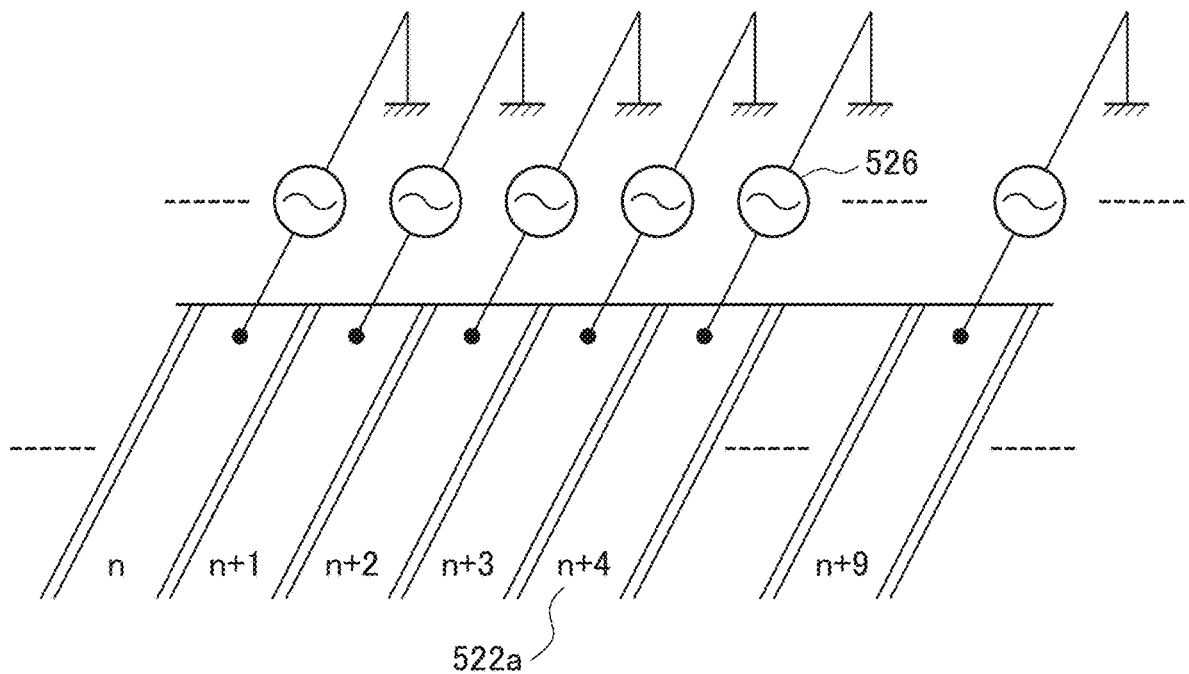
FIG. 12 is an enlarged view of a region S of FIG. 11.
Figure 13:
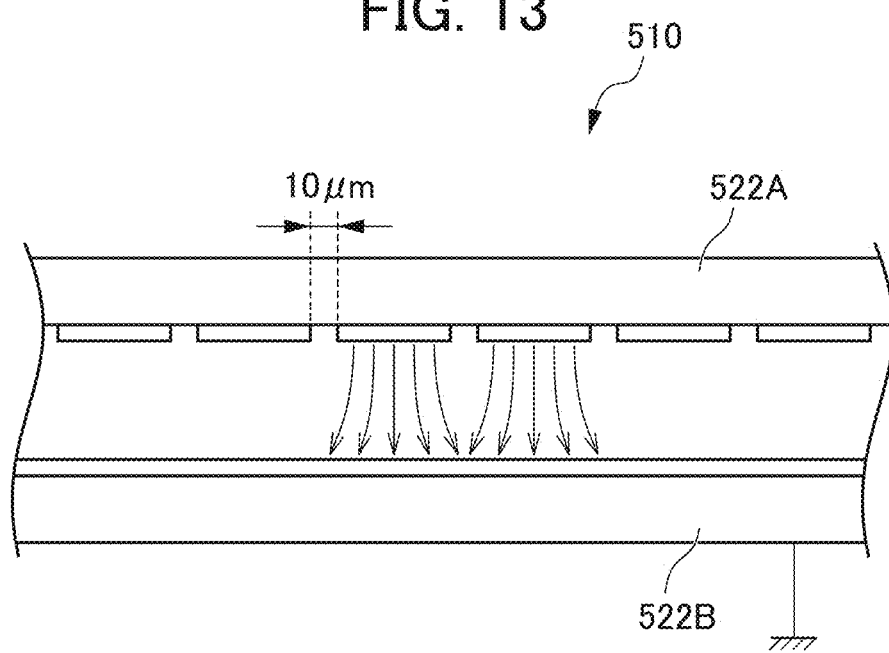
FIG. 13 is a partial sectional view of a region including the first electrode and the second electrode.

FIG. 11 is a diagram illustrating the first electrode 522A and the second electrode 522B of the second embodiment. FIG. 12 is an enlarged view of a region S of FIG. 11. FIG. 13 is a partial sectional view of a region including the first electrode 522A and the second electrode 522B. In this embodiment, the first electrode 522A and the second electrode 522B are in the shape of a rectangle, but are not limited thereto.

(First Electrode)

As illustrated in FIG. 11, the first electrode 522A is divided into a plurality of stripe-like electrodes 522a extending in a y direction along one side of the first electrode 522A. In this embodiment, all of the widths of the stripe-like electrodes 522a (in the drawing, a width in an x direction) are the same, and are arranged with a gap of approximately 10 μm therebetween, at a pitch of 2 mm, to extend in the x direction of the drawing. As illustrated in FIG. 12, each of the stripe-like electrodes 522a is connected to the power source 526, which is the potential difference forming part. Different potentials can be respectively applied to the stripe-like electrodes 522a by adjusting the output of a power source 526 to which each of the stripe-like electrodes 522a is connected. Furthermore, in this embodiment, the power source 526 is an alternating-current power source, but is not limited thereto, and may be a direct-current power source.

(Second Electrode)

On the other hand, the second electrode 522B is grounded without being divided, and the entire region is at the same potential (0 V).

Figure 14:
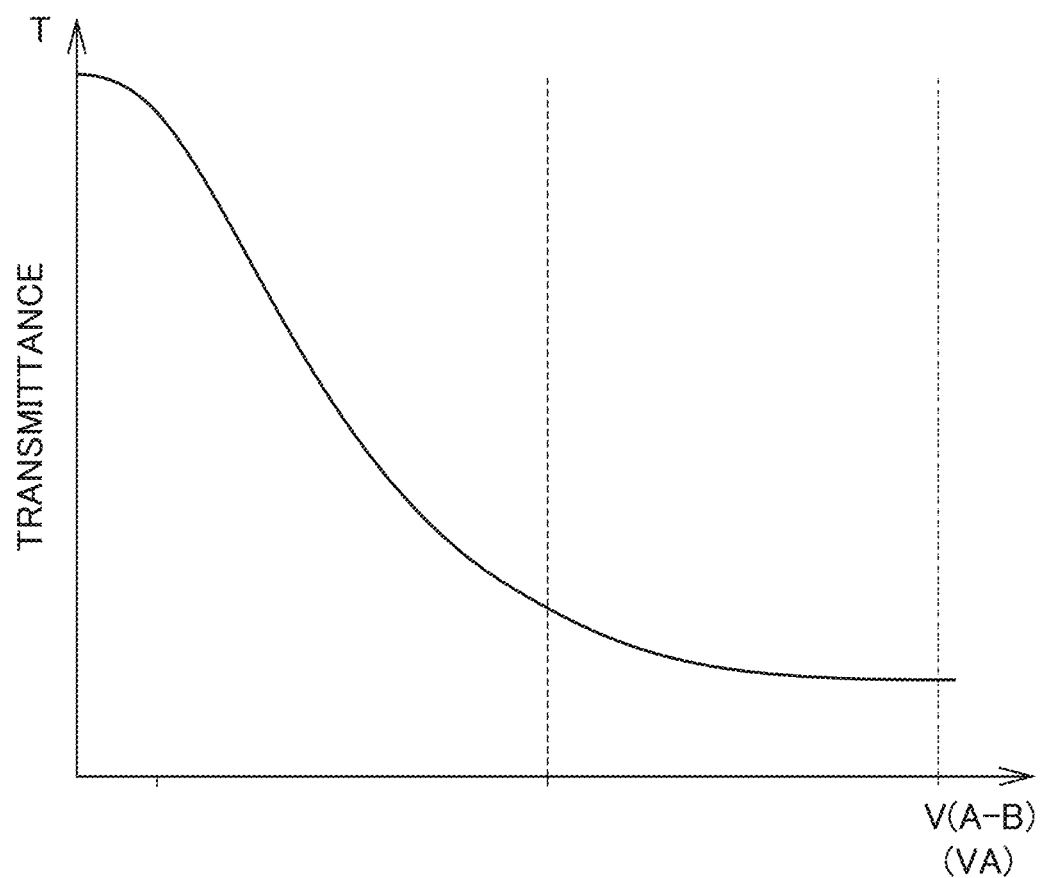
FIG. 14 is a diagram illustrating a relationship between a potential difference between the first electrode and the second electrode, and a transmittance T.

FIG. 14 is a diagram illustrating a relationship between a potential difference V(A–B) between the first electrode 522A and the second electrode 522B (that is, a potential VA of the first electrode) and the transmittance T. In this embodiment, normally white is used. The normally white is a structure in which the transmittance is maximized at the time of not applying a voltage to the liquid crystal. According to the normally white, in a case where the potential difference V(A–B) decreases, the transmittance T increases, and in a case where the potential difference V(A–B) increases, the transmittance T decreases.

In this embodiment, a potential to be applied to the stripe-like electrode 522a, continuously increases from one towards the other of the first electrode 522A in the x direction (from a negative direction towards a positive direction of x). That is, the potential to be applied to the stripe-like electrode 522a, gradually increases from one towards the other of the first electrode 522A in the x direction. Accordingly, the transmittance T decreases (gradually decreases), according to an increase (a gradual increase) in the potential VA of the first electrode.

Table 1 described below is a table showing an example of the transmittance T and the potential VA of 10 adjacent stripe-like electrodes, from the n-th stripe-like electrode 522a from the end portion of x on the negative side, in this embodiment. Here, the transmittances in Table 1 and Table 2 described below, are values measured by a microspectrometer OSP-SP200 (manufactured by Olympus Corporation). In addition, the potentials are values based on a setting applied voltage of a function generator. Furthermore, the potentials may be obtained by directly measuring between the electrodes, with a tester, an oscilloscope, or the like.

As described above, according to this embodiment, the potential to be applied to the stripe-like electrode 522a is adjusted by changing the output of the power source 526, and a gradient is provided with respect to the potential difference V(A–B) between the first electrode 522A and the second electrode 522B, such that the potential continuously increases or decreases from one towards the other in the x direction in which the first electrode 522A and the second electrode 522B extend. Accordingly, it is possible to continuously change the transmittance T of the light control film 510, on the first electrode 522A. In addition, the output of the power source 526 is adjusted within a range of approximately 0.6% to 0.8% (0.7%±0.1%) in which a difference in the transmittances T between the adjacent stripe-like electrodes 522a is not capable of being visually confirmed, and thus, it is possible to increase or decrease a contrast of a contrasting density of the light control film 510, by changing a change rate (a tilt) of the potential VA of the first electrode 522A (the potential difference V(A-B) between the first electrode 522A and the second electrode 522B).

In this embodiment, as described above, a distance between the stripe-like electrodes 522a is 10 μm. In a case where the gap is greater than the numerical value described above, the liquid crystals in the gap are not driven, and thus, a transmittance boundary can be seen. Therefore, it is preferable that the gap is as small as possible. However, it is difficult to manufacture the stripe-like electrodes 522a in a case where the gap is less than 10 μm. In this embodiment, the gap is approximately 10 μm, and thus, the stripe-like electrodes 522a are easily manufactured, and the boundary is rarely seen.

Figure 15:
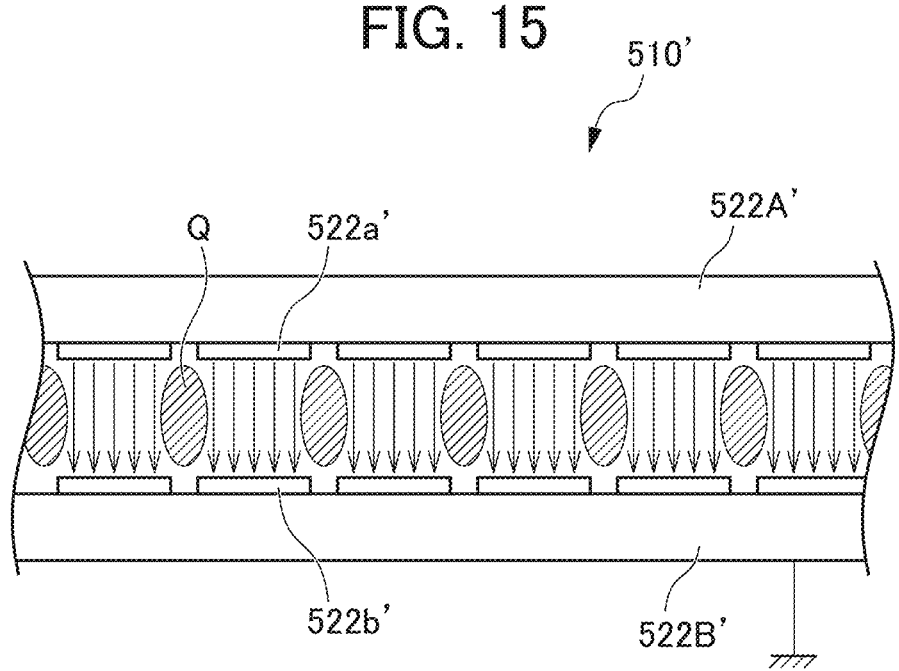
FIG. 15 is a sectional view of the light control film in a case where the second electrode is also separated, as a comparative form.

In this embodiment, as described above, the second electrode 522B is not divided. FIG. 15 is a sectional view of a light control film 510' in a case where a second electrode 522B' is also divided, as a comparative form. As illustrated, in a case where the second electrode 522B' is divided into a

TABLE 1

| Region | n | n + 1 | n + 2 | n + 3 | n + 4 | n + 5 | n + 6 | n + 7 | n + 8 | n + 9 |
|---|---|---|---|---|---|---|---|---|---|---|
| Transmittance T | 44.4% | 43.7% | 43.1% | 42.5% | 41.7% | 41.0% | 40.7% | 39.7% | 38.9% | 38.2% |
| Potential VA | 2.97 V | 3.00 V | 3.03 V | 3.06 V | 3.10 V | 3.14 V | 3.18 V | 3.22 V | 3.27 V | 3.32 V |

In this embodiment, as shown in the table, the potential is applied to the first electrode 522A such that a difference in the transmittances T in the n-th region to the n+9-th region adjacent to each other, is approximately 0.6% to 0.8% (0.7%±0.1%).

Thus, in a case where a difference in the transmittances T of the adjacent stripe-like electrodes 522a is approximately 0.6% to 0.8% (0.7%±0.1%), a boundary line between the stripe-like electrodes 522a is not visually recognized, and thus, the transmittance seems to be smoothly changed.

Furthermore, as a comparison, for example, as shown in Table 2 described below, in a case where a difference in the transmittances is approximately 4%, the boundary line is visually confirmed, and thus, it is recognized that the transmittance T is changed in a stepwise manner.

plurality of stripe-like electrodes 522b', it is necessary to position a first electrode 522A' and the second electrode 522B' (position stripe-like electrodes 522a' and the stripe-like electrodes 522b') at the time of manufacturing, and thus, it takes time and labor for the manufacturing. However, in this embodiment, the second electrode 522B is not divided, and thus, the electrode 522A and the second electrode 522B are easily positioned, and the manufacturing is easily performed.

Further, as illustrated in FIG. 15, in a case where the second electrode 522B' is divided into a plurality of stripe-like electrodes 522b', a non-electrical field region Q in which a potential difference does not occur, is generated in a space interposed between a gap between the stripe-like electrodes 522a' and a gap between the stripe-like electrodes 522b'. The

TABLE 2

| Region | n | n + 1 | n + 2 | n + 3 | n + 4 | n + 5 | n + 6 | n + 7 | n + 8 | n + 9 |
|---|---|---|---|---|---|---|---|---|---|---|
| Transmittance T | 65% | 61% | 57% | 53% | 49% | 44% | 40.3% | 36% | 32% | 28% |
| Potential VA | 2.35 V | 2.44 V | 2.54 V | 2.66 V | 2.80 V | 2.97 V | 3.18 V | 3.48 V | 4.0 V | 5.3 V | liquid crystals existing in the non-electrical field region Q are not driven, and thus, in the case of the normally white, a portion where the transmittance is high, is generated into the shape of a line. However, as with this embodiment, in a case where the second electrode 522B is not divided, lines of an electrical force of both of the divided regions in the first electrode 522A, as illustrated in FIG. 13, are slightly tilted, and the area of the non-electrical field region is reduced or the non-electrical field region is not generated, and thus, a region where the liquid crystals are not driven, is also reduced or not generated. Therefore, in the case of the normally white, a line portion in which the transmittance is high, is not generated, and thus, the transmittance is smoothly changed, and the contrasting density of the light control film 510 is also smoothly changed.

Third Embodiment

Figure 16:
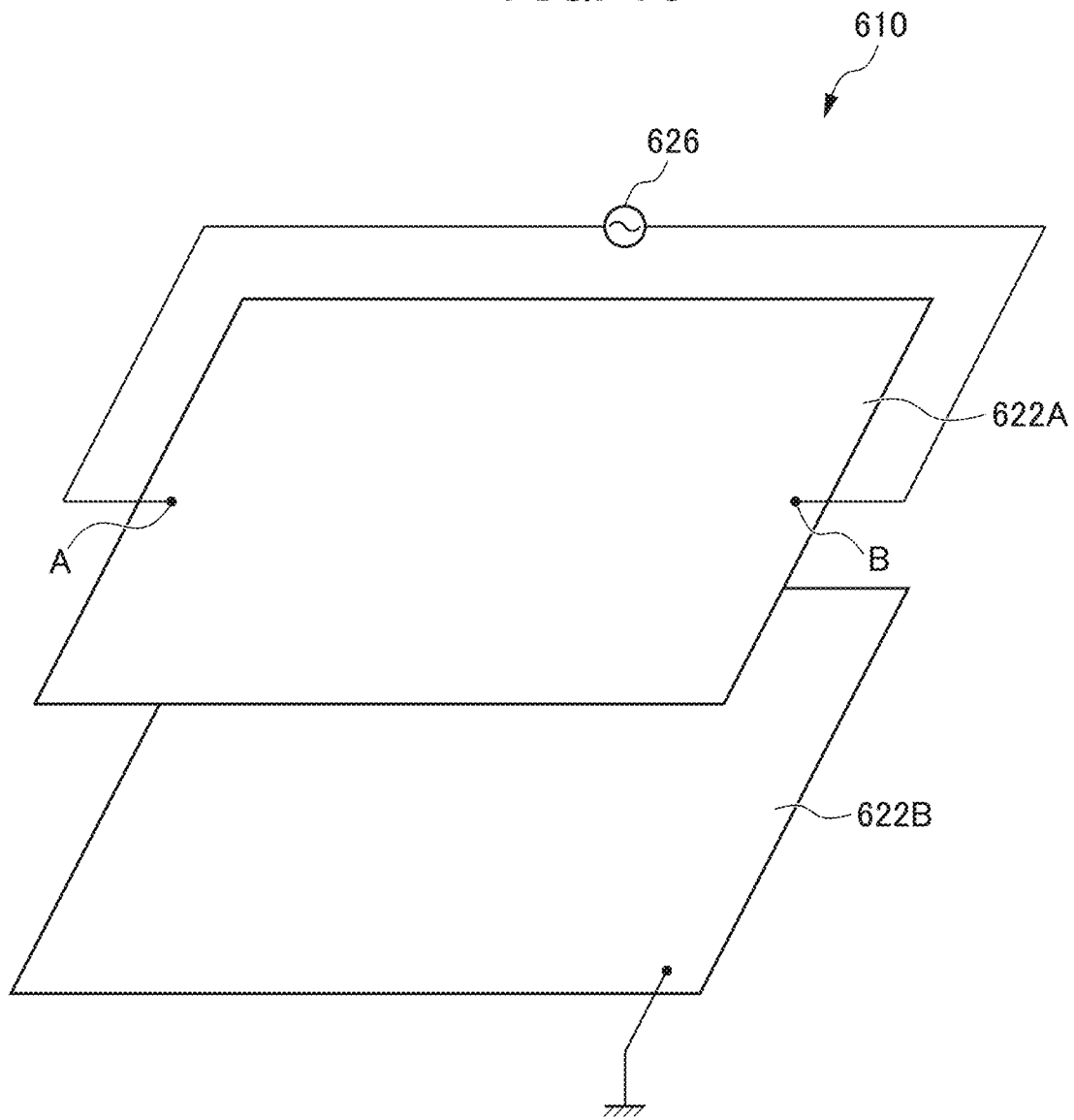
FIG. 16 is a diagram illustrating a first electrode and a second electrode of a third embodiment.

FIG. 16 is a diagram illustrating a first electrode 622A and a second electrode 622B of a light control film 610 of the third embodiment. Furthermore, in the light control film 610 of third embodiment, the same guest-host type system as that of the second embodiment, may be adopted, and a system may be adopted in which a liquid crystal cell is interposed between linear polarization plates. In the third embodiment, the first electrode 622A is not divided into a stripe-like electrodes, unlike the second embodiment. A power source 626 providing a potential difference between one point A of the first electrode 622A and a point B separated from the point A, is provided. The second electrode 622B is grounded as with the second embodiment. Furthermore, in this embodiment, power feeding is performed with respect to the point A and the point B, but is not limited thereto, and a power feeding unit, for example, may be provided into the shape of a line. In a case where the power feeding unit is provided into the shape of a line, it is preferable that the power feeding unit extends in parallel to an end side of the first electrode 622A.

A potential difference to be applied between the point A and the point B is adjusted by changing the output of the power source 626, and thus, a gradient is provided with respect to the potential difference V(A-B) between the first electrode 622A and the second electrode 622B, such that the potential continuously increases or decrease from one towards the other in an x direction in which the first electrode 622A and the second electrode 622B extend. Accordingly, it is possible to continuously change the transmittance T of the light control film 610, on the first electrode 622A.

Figure 17:
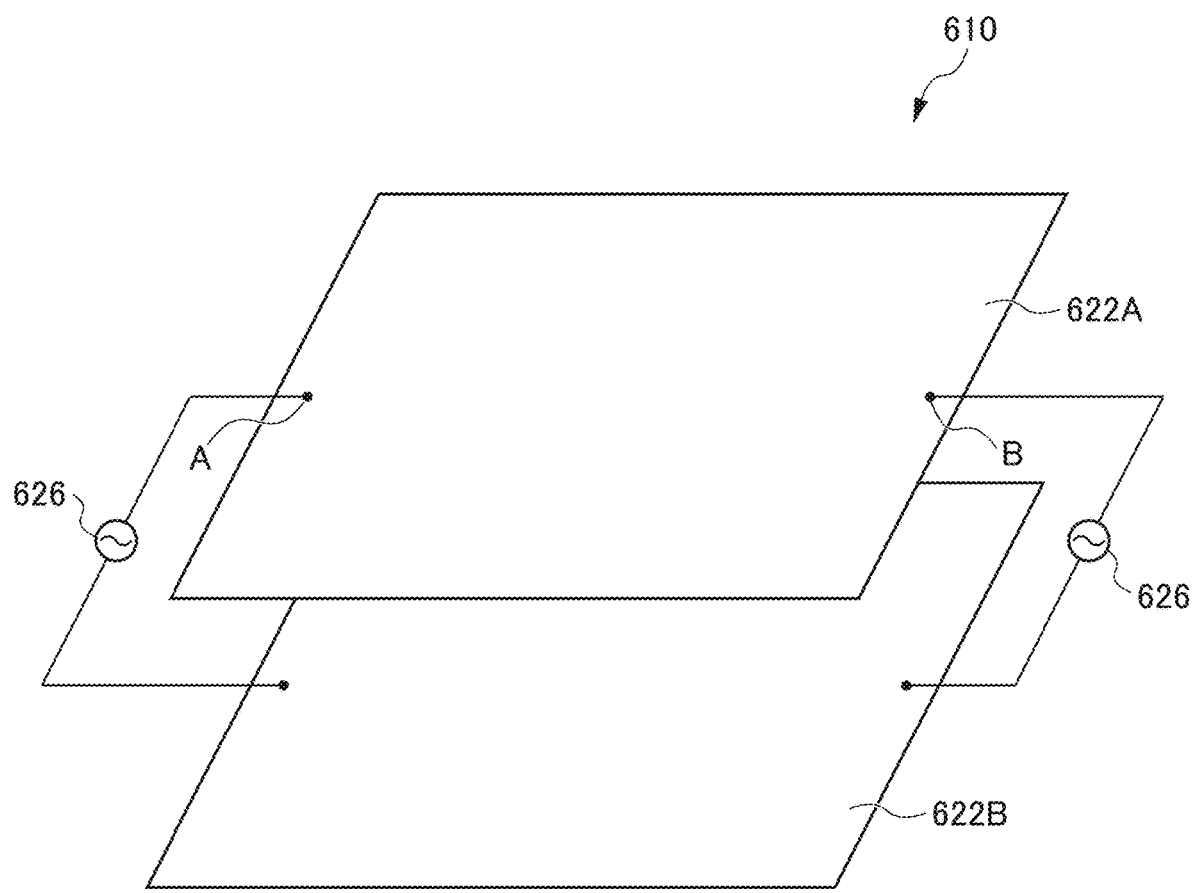
FIG. 17 is a diagram illustrating another example of power connection of the first electrode and the second electrode of the third embodiment.

FIG. 17 is a diagram illustrating another example of power connection of a first electrode and a second electrode of the third embodiment. In addition to the form described above, as illustrated in FIG. 17, in the light control film 610, the power source 626 may be provided between one end portion of the first electrode 622A and one end portion of the second electrode 622B, and between the other end portion of the first electrode 622A and the other end portion of the second electrode 622B, respectively. According to such a configuration, the light control film 610 is capable of adjusting a potential difference between the point A and the point B, and is capable of continuously changing the transmittance between the point A and the point B.

Fourth Embodiment

Figure 18:
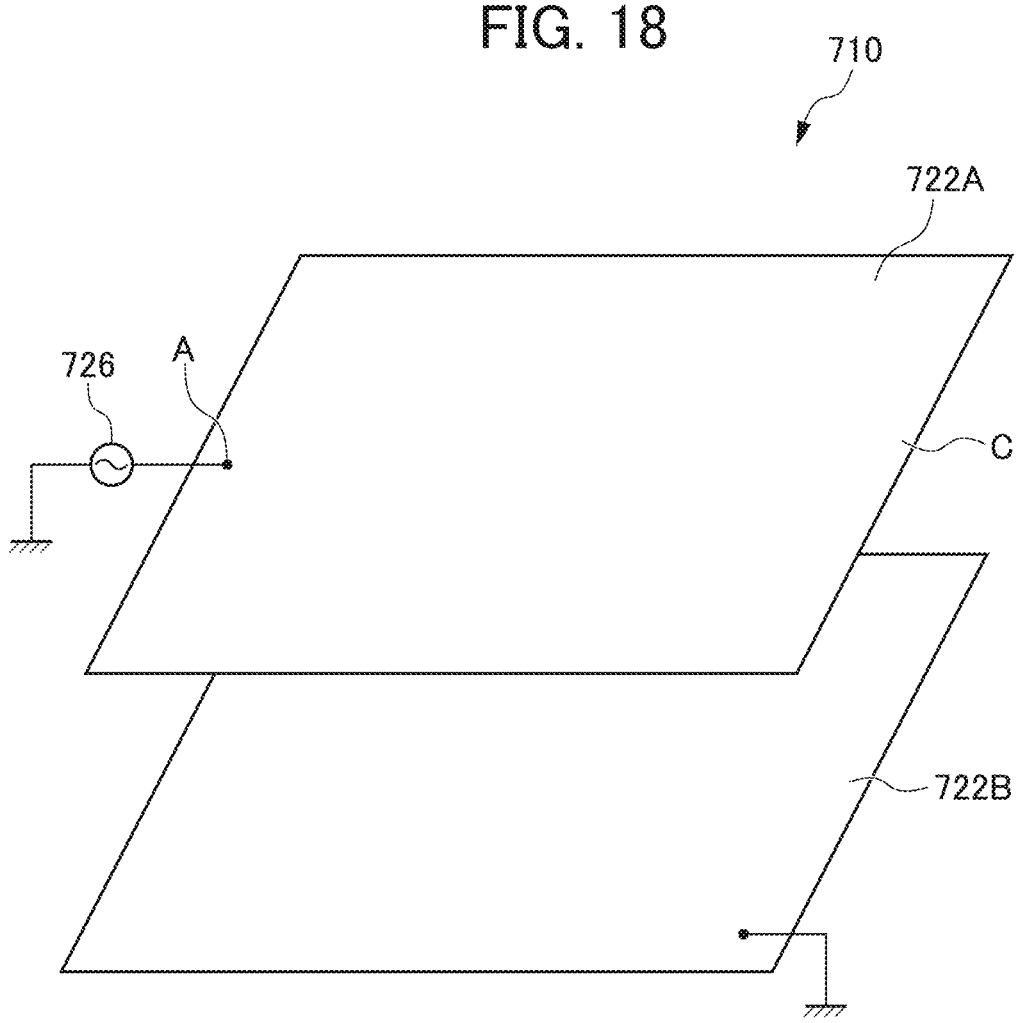
FIG. 18 is a diagram illustrating a first electrode and a second electrode of a fourth embodiment.
Figure 19:
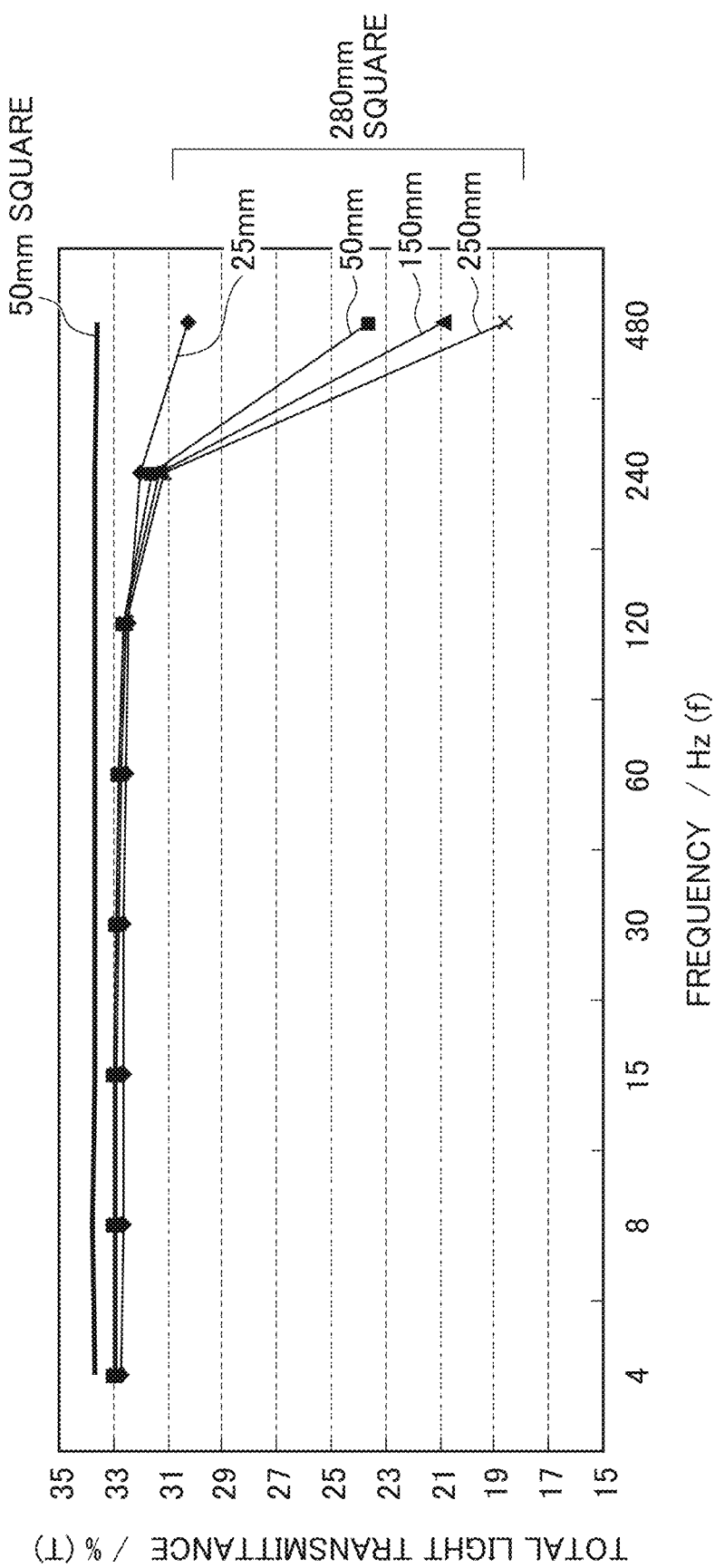
FIG. 19 is a graph illustrating a relationship between a frequency of an alternating-current voltage to be applied, and a transmittance in a case where the size of the first electrode is different.

FIG. 18 is a diagram illustrating a first electrode 722A and a second electrode 722B of the fourth embodiment. In a light control film 710 of the fourth embodiment, a liquid crystal cell is interposed between linear polarization plates, and a VA system is adopted to the driving of the liquid crystal layer. Even in the fourth embodiment, the first electrode 722A is not divided into stripe-like electrodes, unlike the second embodiment. The first electrode 722A of the fourth embodiment, is connected to a power source 726 at a point A. The power source 726 applies an alternating-current voltage to the first electrode 722A. The potential of the first electrode 722A varies on the basis of the applied alternating-current voltage. FIG. 19 is a graph illustrating a relationship between a frequency f of the alternating-current voltage to be applied to the first electrode 722A, and the transmittance T in a case where the size of the light control film 710 (the size of the first electrode 722A and the second electrode 722B) is different. The voltage is an alternating-current voltage of ±10 V. When the light control film 710 is 50 mm square, a change in the transmittance T is not observed, and is approximately 34%, even in a case where the frequency f of the alternating-current voltage varies in a range of 4 to 480 Hz. Even in a case where the light control film 710 is 280 mm square, a change in the transmittance T is not observed, and is approximately 33%, insofar as the frequency f of the alternating-current voltage is in a range of approximately 4 to 120 Hz. However, in a case where the frequency is greater than 120 Hz, and a distance from a power feeding point A increases, the transmittance T decreases. For example, in a case where the frequency f is 480 Hz, the transmittance T in a position where the distance from the power feeding point A is 25 mm, is approximately 30.5%. The transmittance T in a position where the distance from the power feeding point A is 50 mm, is approximately 24%. The transmittance T in a position where the distance from the power feeding point A is 150 mm, is approximately 21.5%. The transmittance T in a position where the distance from the power feeding point A is 250 mm, is approximately 19%. Furthermore, in this embodiment, normally black is used. The normally black is a structure in which a transmittance T is minimized at the time of not applying a voltage to the liquid crystal, and thus, a screen becomes black.

Figure 20A:
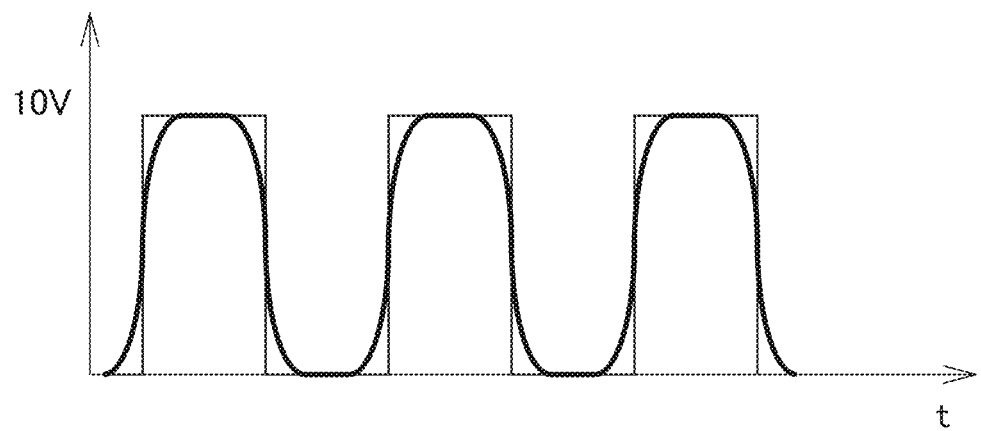
FIGS. 20A and 20B are a graph illustrating a variation in the potential, for example, in a position of a point C of FIG. 18, separated from a power feeding point, in a case where the frequency of the alternating-current voltage to be applied to the first electrode is different.
Figure 20B:
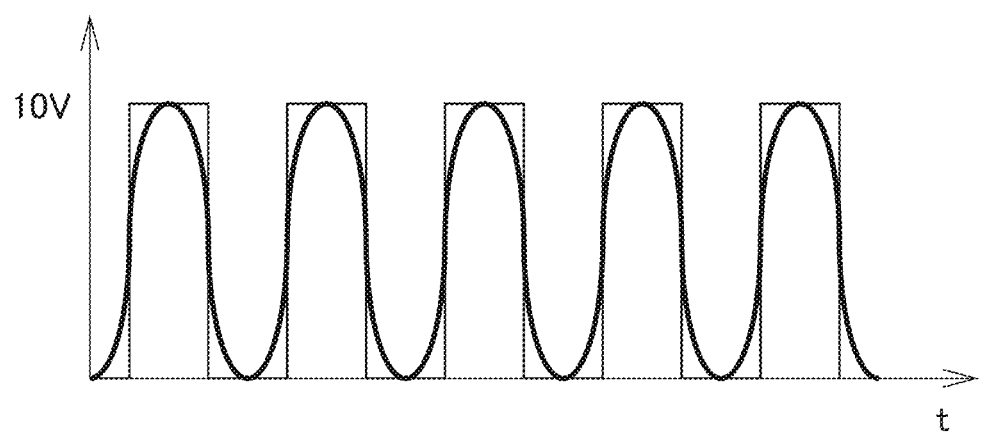

FIGS. 20A and 20B are a graph illustrating a variation in the potential, for example, at a point C of FIG. 18, separated from the power feeding point A, in a case where the frequency f is different. FIG. 20A is a case where the frequency f is low, and FIG. 20B is a case where the frequency f is high. In a case where the alternating-current voltage is applied to the power feeding point A, a time constant of a variation in the potential is greater than that of the power feeding point A, in a position separated from the power feeding point A. Therefore, for example, even in a case where a potential of ±10 V is applied, a time for which the potential is ±10 V, decreases in the position of the point C, separated from the power feeding point A. Therefore, an effective voltage decreases. In a case where the frequency f increases, the effective voltage remarkably decreases, and in a case where the area of the light control film 710 increases, the effective voltage remarkably decreases in the position separated from the power feeding point A. Therefore, actually, it is the same as a state where the potential is low. In this embodiment, the frequency f of the alternating-current voltage to be applied, is adjusted by using such a phenomenon, and thus, the transmittance in a position C separated from the power feeding point A, is adjusted. That is, in the case of adding a gradation to an in-plane transmittance of the light control film 710, the frequency is set to be high, and in the case of setting the transmittance to be constant, the frequency is set to be low (for example, less than or equal to 120 Hz). In addition, in the case of adding a gradation with a large difference in contrasting densities, the frequency is set to be higher.

FIGS. 21A to 21E are a picture illustrating a state of the transmission in a case where alternating-current voltages of different frequencies are applied to a light control film of 280 mm square. FIG. 21A is a case where the frequency of the alternating-current voltage is 60 Hz, FIG. 21B is a case where the frequency of the alternating-current voltage is 120 Hz, FIG. 21C is a case where the frequency of the alternating-current voltage is 240 Hz, FIG. 21D is a case where the frequency of the alternating-current voltage is 480 Hz, and FIG. 21E is a case where the frequency of the alternating-current voltage is 960 Hz. As illustrated in the picture, it is known that in a case where the frequency of the alternating-current voltage to be applied, increases, the transmittance in the position separated from the power feeding point A, does not increase. As described above, even in this embodiment, the transmittance T is continuously changed as with the second embodiment, and thus, it is possible to increase or decrease the contrast of the contrasting density of the transmittance by adjusting the frequency of the potential to be fed from the power source.

(Modification Form)

(1) As described above, the liquid crystal light control film of the VA system has been described as each of the embodiments of the present invention, but the present invention is not limited thereto, and other systems may be used in which a light control amount can be adjusted according to a potential. The other systems of the liquid crystals are described above, and for example, a device in which light and dark (a transmittance) is changed according to a potential difference between electrodes, such as an EC type light control film, an SPD type light control film, and a PDLC type light control film, may be used as a system using other than the liquid crystal. A light control film using an electro chromic (EC) system, has a structure in which a light control layer (an electrolyte layer) is interposed between a pair of electrodes. The color of the light control layer is changed between a transparent color and a navy-blue color, according to a potential difference between the electrodes, by using an oxidation-reduction reaction. A light control film using a suspended particle device (SPD) system uses the alignment of fine particles, and is usually colored with a navy-blue color, but is changed to a transparent color in the case of applying a voltage, and returns to the original navy-blue color in the case of not applying a potential, and thus, is capable of adjusting the contrasting density according to the voltage. A light control film using a polymer dispersed liquid crystal (PDLC) system, forms a network structure of a special polymer in a liquid crystal layer, and induces a state where the arrangement of the liquid crystal molecules is irregular, to scatter light, by a function of a polymer network. Then, in a case where liquid crystal molecules are arranged in an electrical field direction by applying a voltage, a transparent state is obtained without scattering the light.

(2) In the first embodiment, the normally black has been described in which the transmittance is low in a case where the voltage is not applied, but normally white may be used according to the type of liquid crystal. Furthermore, as described above, the normally black is a structure in which the transmittance is minimized at the time of not applying a voltage to the liquid crystal, and a screen becomes black. The normally white is a structure in which the transmittance is maximized at the time of not applying a voltage to the liquid crystal, and a screen becomes transparent.

(3) In the first embodiment, power feeding is performed from one side of the rectangular electrode, and the resistance is connected to the other side facing one side, through a triple pole switch, but is not limited thereto. For example, the power feeding may be performed from one point, but not the entire one side. In this case, a potential line is in the shape of an annular ring.

(4) In addition, in the first embodiment, the power feeding is performed from one side of the rectangular electrode, and the other side to which the resistance is connected, may be an adjacent side, but not the facing side. Further, the side from which the power feeding is performed, or the side to which the resistance is connected, may be one side, or may be two or more sides.

(5) In the first embodiment, a current to be applied between the electrodes is the direct current, but is not limited thereto, and may be an alternating current.

Furthermore, in a case where the second conductive unit 222B of FIG. 3 is connected to the earth, there is a potential gradient of the first electrode 22A, but there is no potential gradient of the second electrode 22B, and thus, the second electrode 22B is at a constant voltage (the earth). According to such connection, a phenomenon that a gradation is not added at the time of being seen from an oblique direction, occurs. However, even in such a case, it is possible to add an in-plane gradation in the case of being seen from a front direction.

(6) In addition, in the first embodiment described above, a case where the light control film is configured by interposing the liquid crystal cell between the linear polarization plates, has been described, but the present invention is not limited thereto, and can be widely applied to a case where a light control film is configured by using a liquid crystal layer of guest-host type liquid crystals to omit the linear polarization plate.

(7) In the second embodiment described above, an example in which the first electrode 522A is divided into the plurality of stripe-like electrodes 522a extending in the y direction along one side, has been described, but the present invention is not limited thereto. The shape of the stripe-like electrode 522a is not limited to a band shape along a side, but may be formed into the shape of a curve (for example, the shape of a wave, an arc, an elliptic arc, or the like), or into the shape of a polygonal line (for example, the shape of a triangular wave, a rectangular wave, or the like). Here, each of the stripe-like electrodes 522a may be formed to have a constant width dimension, each of the stripe-like electrodes 22a may be formed to have different width dimensions, and further, each of the width dimensions may be changed in an extending direction.

As described above, specific configurations suitable for the implementation of the present invention have been described in detail, but the embodiments described above can be variously modified within a range not departing from the spirit of the present invention.

EXPLANATION OF REFERENCE NUMERALS 10, 510, 610, 710 LIGHT CONTROL FILM
12, 512 FIRST LAMINATE
13, 513 SECOND LAMINATE
14, 514 LIQUID CRYSTAL LAYER
15, 515 LIQUID CRYSTAL CELL
16, 17 LINEAR POLARIZATION PLATE
18, 19 PHASE DIFFERENCE FILM
20 POWER SOURCE
21A, 21B, 521A, 521B BASE MATERIAL 22A, 522A, 622A, 722A FIRST ELECTRODE
22B, 522B, 622B, 722B SECOND ELECTRODE
522a STRIPE-LIKE ELECTRODE
522b STRIPE-LIKE ELECTRODE
23A, 23B ALIGNMENT LAYER
24 SPACER
25 SEAL MATERIAL
526, 626, 726 POWER SOURCE
30 THREE-WAY SWITCH
31 VARIABLE RESISTANCE
221A, 221B, 222A, 222B CONDUCTIVE UNIT

The invention claimed is:

1. A light control film, comprising:
a first electrode and a second electrode disposed facing each other;
a light control material disposed between the first electrode and the second electrode and changing a transmittance in accordance with a potential difference between the first electrode and the second electrode;
a potential difference forming part for forming a potential difference between the first electrode and the second electrode; and
the first electrode and the second electrode are formed on a flexible film material,
wherein:
the first electrode is divided by a plurality of gaps and is arranged in three or more regions;
the potential difference forming part is a power source feeding a frequency variable alternating-current voltage to the first electrode, and different potentials are respectively applied to the first electrodes by adjusting an output of the power source to which each of the first electrodes is connected; and
when the potential difference forming part makes the frequency variable alternating-current voltage feeding the first electrode the same, the transmittance at a position separated from a power feeding point is lower in a case of high frequency than in a case of low frequency.

2. A method for driving a light control film including,
a first electrode configured to face a second electrode;
a light control material disposed between the first electrode and the second electrode and changing a transmittance in accordance with a potential difference between the first electrode and the second electrode;
a potential difference forming part for forming a potential difference between the first electrode and the second electrode; and
the first electrode and the second electrode are formed on a flexible film material, wherein the first electrode is divided by a plurality of gaps and arranged in three or more regions, the method comprising:
feeding a frequency variable alternating-current voltage to the first electrode, the potential difference forming part being a power source; and
applying different potentials to the first electrode that includes a plurality of first electrodes by adjusting an output of the power source to which each of the first electrodes is wherein, when making the frequency variable alternating-current voltage feeding the first electrode the same, the transmittance at a position separated from a power feeding point is lower in a case of high frequency than in a case of low frequency.

3. A light control film, comprising:
a first electrode and a second electrode disposed facing each other;
a light control material disposed between the first electrode and the second electrode and changing a transmittance in accordance with a potential difference between the first electrode and the second electrode; and
a potential difference forming part for forming a potential difference between the first electrode and the second electrode,
wherein the potential difference forming part is a power source feeding a frequency variable alternating-current voltage to the first electrode, and
wherein, when the potential difference forming part makes the frequency alternating-current voltage feeding the first electrode the same, the transmittance at a position separated from power feeing point is lower in a case of high frequency than in a case of low frequency.

4. A method for driving a light control film including,
a first electrode and a second electrode disposed facing each other, and
a light control material disposed between the first electrode and the second electrode and changing a transmittance in accordance with a potential difference between the first electrode and the second electrode, the method comprising:
feeding a frequency variable alternating-current voltage to the first electrode, wherein, when making the alternating-current voltage feeding the first electrode as the same, the transmittance at a position separated from a power feeding point is lower in a case of high frequency than in a case of low frequency.

* * * * *